(12) United States Patent
Sugahara et al.

(10) Patent No.: US 6,888,967 B2
(45) Date of Patent: *May 3, 2005

(54) DATA CODING METHOD AND APPARATUS THEREFOR

(75) Inventors: Takayuki Sugahara, Kanagawa-ken (JP); Junzo Suzuki, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/386,445

(22) Filed: Mar. 13, 2003

(65) Prior Publication Data

US 2003/0154687 A1 Aug. 21, 2003

Related U.S. Application Data

(63) Continuation of application No. 09/467,862, filed on Dec. 20, 1999, now Pat. No. 6,567,554, which is a continuation-in-part of application No. 09/337,604, filed on Jun. 21, 1999, now Pat. No. 6,483,944.

(30) Foreign Application Priority Data

Mar. 12, 1999 (JP) .......................................... P11-067357
Mar. 12, 1999 (JP) .......................................... P11-067526

(51) Int. Cl.$^7$ ............................................... A06K 9/36
(52) U.S. Cl. ........................ 382/232; 382/236; 382/253
(58) Field of Search ................................ 382/253, 232, 382/236, 238, 244, 245, 248, 250, 251; 375/240; 386/65, 68, 95; 52/750

(56) References Cited

U.S. PATENT DOCUMENTS 6,483,944 B1 * 11/2002 Sugahara et al. ........... 382/232

FOREIGN PATENT DOCUMENTS

| EP | 0 724 264 | 7/1996 |
|---|---|---|
| EP | 0 804 035 | 10/1997 |
| JP | 7-284097 | 10/1995 |
| JP | 11-008850 | 1/1999 |
| JP | 11-074799 | 3/1999 |
| JP | 2000-023096 | 1/2000 |
| JP | 2000-083255 | 3/2000 |
| WO | WO 97/39588 | 10/1997 |

OTHER PUBLICATIONS

Keesman, Gertjan, et al., "Bit–rate control for MPEG encoders". Image Communication 6: 545–560, 1995.

Lee, Liang–Wei, et al., "On the Error Distribution Scene Change for the Bit Rate Control of MPEG". IEEE Transactions on Consumer Electronics 39: 545–554, 1993.

* cited by examiner

*Primary Examiner*—Anh Hong Do
(74) *Attorney, Agent, or Firm*—Nath & Associates PLLC; Marvin C. Berkowitz; Derek Richmond

(57) ABSTRACT

A picture target amount-of-code calculating unit calculates a target amount of codes for each picture type that corresponds to an encoding rate that has been determined by an audio/video encoding rate determining unit. An amount-of-code controlling unit controls the quantizing scale of a quantizing unit so as to make the target amount of codes for each picture type match with a total amount of codes of a unit as a whole. A unit address calculating unit calculates the addresses used when a search is made, as navigation data, on the basis of the target amount of codes for each picture type and the encoding rate. A unifying unit makes a construction of the unit while, on the other hand, a navigation data producing unit depicts navigation data at a foremost position of the unit.

9 Claims, 16 Drawing Sheets

DATA CODING METHOD AND APPARATUS THEREFOR

This application is a continuation of Ser. No. 09/467,862 filed Dec. 20, 1999 now U.S. Pat. No. 6,567,554 which is a continuation-in-part of application Ser. No. 09/337,604 filed on Jun. 21, 1999 now U.S. Pat. No. 6,483,944.

BACKGROUND OF THE INVENTION

1. Field of the Invention

The present invention concerns a data coding method and an apparatus therefor which enable, for example, coded audio and video data to be stored respectively into units, as a row of packs that is to be reproduced within a prescribed period of time. Especially, the invention concerns a data coding method and an apparatus therefor which make it possible to realize, while keeping the quality of a picture image stably, encoding, before encoding of audio and video data, that permits depiction of navigation data such as data length and starting address that are calculated from a value corresponding to the amount of codes of the coded data.

2. Related Art

In recent years, a data compaction system for use on a moving picture image has hitherto been internationally standardized as an MPEG (Moving Picture Experts Group) system. This MPEG system is known as a system for performing variable compaction of video data. In the MPEG system, there are defined compaction systems which are called "MPEG 1" (MPEG phase 1) and "MPEG 2" (MPEG phase 2).

Concretely, the MPEG is prepared by several techniques being combined with one another. First, a time redundancy portion is reduced by subtracting a picture image signal that has been obtained by being decoded by a motion compensation unit from an input picture image signal.

As the method of prediction, there are three modes, as fundamental modes, i.e., a mode in which prediction is performed from past picture images, a mode in which prediction is performed from future picture images, and a mode in which prediction is performed from both past picture images and future picture images. Also, each of these modes can be used by being switched in units of a macroblock (MB) composed of 16 pixels×16 pixels. The method of prediction is determined according to the picture type ("Picture_Type") that has been imparted to an input picture image. As the picture types, there are a one-directional between-picture prediction encoded picture image (P-picture), bi-directional between-picture prediction encoded picture image (B-picture), and intra-picture independently encoded picture image (I-picture). In the P-picture type (one-directional between-picture prediction encoded picture image), there are two modes one of which is to encode by performing prediction from past picture images and the other of which is to independently encode a macroblock without performing relevant prediction. In the B-picture (bi-directional between-picture prediction encoded picture image), there are four modes, a first one of which is to perform prediction from future picture images, a second one of which is to perform prediction from past picture images, a third one of which is to perform prediction from both past picture images and future picture images, and a fourth one of which is to encode independently without performing any prediction. In the I-picture (intra-picture independently encoded picture image), all macroblocks are each independently encoded. It is to be noted that the I-picture is called "an intra-picture" and that, therefore, the one-directional between-picture prediction encoded picture image and the bi-directional between-picture prediction encoded picture image can each be referred to as "a non-intra-picture".

In the motion compensation, by performing pattern matching of the movement regions in units of a macroblock, a motion vector is detected with a half pixel precision and prediction is made after shifting of the macroblock to an extent corresponding to the thus-detected motion vector. The motion vector includes horizontal and vertical motion vectors, and this motion vector is transmitted as additional messages for macroblock along with an MC (Motion Compensation) mode that indicates where prediction is made from.

The pictures from the I-picture to a picture that immediately precedes the next I-picture are called "GOP (Group Of Picture)". In a case where pictures are used in accumulation media or the like, approximately 15 pictures or so are generally used as 1 GOP.

FIG. 1 illustrates a fundamental construction of a video encoder that is among audio/video encoding apparatuses, to which the MPEG is applied.

In this FIG. 1, an input picture image signal is supplied to an input terminal 101. This input picture image signal is sent to a calculating unit 102 and to a motion compensation and prediction unit 111.

In the calculating unit 102, a difference between a picture image signal, which has been decoded in the motion compensation and prediction unit 111, and the input picture image signal is determined, and a picture image signal corresponding to this difference is sent to a DCT unit 103.

In the DCT unit 103, the differential picture image signal that has been supplied is subjected to orthogonal transformation. Here, the DCT (Discrete Cosine Transform) means an orthogonal transformation through which an integrating transformation that uses a cosine function as an integrating kernel is changed to a discrete transformation that is made into a finite space. In the MPEG system, two-dimensional DCT is performed of 8×8 DCT blocks that have been obtained by dividing the macroblock into four parts. It is to be noted that in general a video signal is composed of a large amount of low frequency band components and a lesser amount of high frequency band components and that, therefore, when performing DCT, the coefficients thereof are concentratedly gathered into the low band. Data that has been obtained by performance of the DCT in the DCT unit 103 is sent to a quantizing unit 104.

In the quantizing unit 104, quantization is performed of the DCT coefficients from the DCT unit 103. In the quantization performed in this quantizing unit 104, a two-dimensional frequency of 8×8, which constitutes a quantizing matrix is weighted by visual characteristics. The value that has been resultantly obtained is further made scalar-fold by a quantizing scale. And using the thus-obtained value as a quantizing value, the DCT coefficient is divided by this value. It is to be noted that when performing inverse quantization, by a decoder (video decoder), of coded data after the encoding performed by this video encoder, multiplication of it is made by the quantizing value that was used in the video encoder. As a result of this, it is possible to obtain a value that is approximate to the original DCT coefficient. Data that has been obtained by the quantization made in the quantizing unit 104 is sent to a variable length coder (VLC) 105.

The VLC 105 performs variable length coding on the quantized data from the quantizing unit 104. In this VLC 105, of the quantized values, with respect to direct current (DC) components, coding is performed using DPCM (differential pulse code modulation) that is one of the prediction coding techniques. On the other hand, with respect to alternating current (AC) components, so-called "Huffman coding" is performed in which so-called "zigzag scan" is performed from a low band to a high band and, by counting the run length and effective coefficient value of a zero as being one piece of significant event, a code having a shorter code length is allotted to the data sequentially from one, the probability of whose occurrence is higher. Also, to the VLC 105 there are also supplied from the motion compensation and prediction unit 111 motion vector and prediction mode messages, whereby the VLC 105 outputs these motion vector and prediction mode messages as well as the variable coded data as additional data with respect to the macroblock. Data that has been obtained by the variable length coding performed in the VLC 105 is sent to a buffer memory 106.

The buffer memory 106 temporarily stores therein the variable length coded data from the VLC 105. Thereafter, the coded data (the coded bit stream) that has been read out from the buffer memory 106 at a prescribed transfer rate is output from an output terminal 113.

Also, the amount of codes generated in macroblock units that regards the thus-outputted coded data is transmitted to an amount-of-code controlling unit 112 as later described. The amount-of-code controlling unit 112 determines an error amount of code that is the difference between the amount-of-code generated and a target amount of code in macroblock units, and produces an amount-of-code control signal that corresponds to the error amount-of-code and thereby feeds it back to the quantizing unit 104, thereby performing control of the amount-of-code generated. The amount-of-code control signal that is fed back to the quantizing unit 104 in order to perform the amount-of-code control is a signal for controlling the quantizing scale in the quantizing unit 104.

On the other hand, picture image data that has been quantized in the quantizing unit 104 is also sent to an inversely quantizing unit 107.

The inversely quantizing unit 107 performs inverse quantization of the quantized data that has been sent from the quantizing unit 104. DCT coefficient data that has been obtained through the operation of this quantization is sent to an inverse DCT unit 108.

The inverse DCT unit 108 performs inverse. DCT of the DCT coefficient data from the inversely quantizing unit 107 and thereafter sends the resulting data to a calculating unit 109.

The calculating unit 109 adds a predicted differential picture image from the motion compensation and prediction unit 111 to the output signal of the inverse DCT unit 108. As a result of this, a picture image signal is restored.

The thus-restored picture image signal is temporarily stored in a picture image memory 110 and thereafter is read out and sent to the motion compensation and prediction unit 111.

The picture image signal that has been sent from the picture image memory 110 to the motion compensation and prediction-unit 111 is used for the purpose of producing a decoded picture image that serves as a reference for calculating a differential picture image in the calculating unit 102.

The motion compensation and prediction unit 111 detects a movement vector from the input picture image signal and shifts the picture image by the extent corresponding to a size of the thus-detected movement vector and thereafter performs prediction. A predicted differential picture image signal that has been obtained by this prediction is sent to the calculating units 102 and 109. Also, the movement vector that has been detected by the motion compensation and prediction unit 111 is sent to the VLC 105 together with the prediction mode (MC mode) message.

It is to be noted that the picture image on which coding of the differential picture image signal is performed as mentioned above is one of the P-picture and B-picture types, and that, in the case of a picture image of the I-picture type, the input picture image signal is coded as is.

FIG. 2 illustrates a fundamental construction of a video decoder that decodes coded data that has been coded by the video encoder illustrated in FIG. 1.

In this FIG. 2, a coded data is supplied to an input terminal 121. The coded data is sent to a variable length decoding unit 122 (VLD). The VLD 122 performs variable length decoding on the data that is inverse processing of the variable length coding in the VLC 105 of FIG. 1. Data that is obtained by the variable length decoding corresponds to one that has been prepared by addition of the movement vector message and the prediction mode message to the quantized data, which is an input to the VLC 105 of FIG. 1. The quantized data that has been obtained by the variable length decoding performed in the VLD 122 is sent to an inversely quantizing unit 123.

The inversely quantizing unit 123 performs inverse quantization of the quantized data from the VLD 122. Data that has been obtained by this inverse quantization corresponds to the DCT coefficient data that is an input to the quantizing unit 104 of FIG. 1. DCT coefficient data that has been obtained by inverse quantization performed in the inversely quantizing unit 123 is sent to an inverse DCT 124. Also, the movement vector and prediction mode messages are sent from the inversely quantizing unit 123 to a motion compensation and prediction unit 127.

The inverse DCT 124 performs inverse DCT of the DCT coefficient from the inversely quantizing unit 123. Data that has been obtained by the inverse DCT performed in the inverse DCT unit 124 corresponds to the differential picture image signal that is an input to the DCT unit 103 of FIG. 1. The differential picture image signal that has been obtained by the inverse DCT performed in the inverse DCT unit 124 is sent to a calculating unit 125.

The calculating unit 125 adds the predicted difference picture image from the motion compensation and prediction unit 127 to the differential picture image signal from the inverse DCT unit 124. As a result of this, decoded data, i.e., picture image signal is restored. The thus-restored picture image signal substantially corresponds to the input picture image signal to the input terminal 101 of FIG. 1. This restored picture image signal (decoded data) is output from an output terminal 128 and simultaneously is temporarily stored in a picture image memory 126 and thereafter is sent to the motion compensation and prediction unit 127.

The motion compensation and prediction unit 127 produces, on the basis of the movement vector and prediction mode, a predicted differential picture image from the picture image signal that has been supplied from the picture image memory 126, and sends this predicted differential picture image to the calculating unit 125.

Although in the MPEG2 it is defined as previously mentioned that setting is made of the transfer-starting time and reproduction time each of which represents video data and audio data with the use of a reference time so as to enable transfer and reproduction with the both data being in synchronism with each other, it is pointed out that although with mere use of only such transfer-starting time and reproduction time messages no problem would exist with normal reproduction, it is difficult to perform specific reproductions such as fast-forwarding reproduction, reverse-winding reproduction, random reproduction, etc. or reproduction processing such as one causing interactiveness to be had in the system.

Under the above-described circumstances, as disclosed in Japanese Patent Application Laid-Open No. 8-273304, there exists an application that is arranged to store audio and video data that has been encoded using the MPEG into an video object unit as a row of packs that is to be reproduced within a prescribed period of time and further to record reproduction message for making a reproduction of this row of packs and search message for making a search, at a foremost position of the packs row as navigation data.

Since the video object unit and navigation data are already disclosed and described in detail in Japanese Patent Application Laid-Open No. 8-27330, a detailed description thereof is omitted but the video object units 85 constitute a cell 84 by being plurally grouped as shown in FIG. 3. Also, the cells 84 constitute a video object 83 by being plurally grouped. Further, these video objects 83 constitute a video object set 82 by being plurally grouped.

The video object unit 85 is defined as a packs row having one piece of navigation pack 86 at a foremost position. Also, within the video object unit 85 there are disposed video packs 88, sub-video packs 90 and audio packs 91 that are determined in the MPEG standard. Also, the video object units 85 have allotted thereto numbers in the sequential order of reproduction, respectively, and the reproduction period of time for reproducing the video object unit 85 corresponds to the reproduction period of time for reproducing video data that is composed of a singular or plural piece of GOPs that are included in the video object unit 85.

In the navigation pack 86 there are disposed as navigation data a reproduction control message for reproducing the video object unit 85, search message for making a search, etc. The reproduction control message is navigation data for making presentation in synchronism with the state of reproduction of video data within the video object unit 85, namely for making an alteration of the contents displayed. Namely, the reproduction control message is a message for determining the reproduction conditions in accordance with the state of presentation data, namely real-time control data that has been dispersed and disposed on a data stream. Also, the search message is navigation data for executing search of the video object unit 85. Namely, the search message is a message for performing seamless reproduction as well as forward fast winding/reverse fast winding reproduction, namely real-time control data that has been dispersed and disposed on a data stream.

Especially, in the search message for making a search of the video object unit 85, there is depicted a message for particularizing the foremost address within the cell 84. Namely, in the search message for searching for the video object unit 85, numbering the video object unit 85 including the search message as being the 0-th unit serving as a reference, the numbers (start addresses) of the video object units 85 of, from the 1st (+1) to the 20th (+20), the 60th (+60), the 120th (+120), and the 240th (+240) in this order are depicted as addresses (forward addresses) for performing forward reproduction of the units in the sequential order of reproduction thereof. Similarly, in the search message for searching for the video object unit 85, numbering the video object unit 85 including the search message as being the 0th unit serving as a reference, the start addresses of the video object units 85 of, from the 1st (−1) to the 20th (−20), the 60th (−60), the 120th (−120), and the 240th (−240) in this order are depicted as addresses (backward addresses) for performing reverse reproduction of the units in a direction reverse to that in the sequential order of reproduction thereof.

By the way, in order to depict into the navigation pack, before starting the MPEG coding, navigation data that contains the above-described reproduction message for making a reproduction of the video object unit and the search message for making a search therefor, it is necessary to use a memory having a large storage capacity. In addition, navigation data must be produced by, after this coding has been finished, observing and measuring the coded results (the amount of codes) and thereby calculating prescribed reproduction data.

Also, as described in Japanese Patent Application Laid-Open No. 8-273304, in a case where, by numbering the above-mentioned video object unit to be the 0th unit in the sequential order of reproduction, it is attempted, using this video object unit as a reference, to depict the addresses of the video object units that are reproduced up to at least the forward and backward 15th units as counted in the sequential order of reproduction, and to depict the addresses of the 20th, 30th, 60th, 120th, and 240th video object units as counted in the sequential order of reproduction, since the coded data of the MPEG video data is basically one that has been prepared by variable length coding, it is impossible to calculate the addresses of the video object units unless all the video coded data has been already prepared like so-called coding by 2 paths. Accordingly, it is impossible to perform real-time coding and recording of navigation data.

SUMMARY OF THE INVENTION

The present invention has been made in view of the above-described problems and has an object to provide a data coding method and an apparatus therefor which enables the depiction of navigation data for depicting a reproduction control message for reproducing the video object unit and a search message for making a search, before the encoding is started, with a storage memory having a minimum required capacity and, whatever the encoding rate may be like, enables real-time encoding and depiction of navigation data while maintaining the picture quality to be at an optimum level.

To attain the above object, according to an aspect of the present invention, there is provided a data coding method wherein input data in prescribed data units is classified into a picture type whose data items are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding method comprising: determining an encoding rate, determining a target amount of codes for each picture type that corresponds to the encoding rate, encoding the input data for each picture type so that the coded data may be in conformity with the target amount of codes, determining, on the basis of the encoding rate and the target amount of codes, addresses of a reference unit for making a search and a prescribed number of units that are reproduced at least before and after the reference unit and an ending address at which there is ended at least data of the picture type having its data items independently encoded, of the data within the unit, constructing as the unit the coded data that has been obtained by being encoded so that the coded data may be in conformity with the target amount of codes, and depicting at a foremost position of the unit the addresses of the unit and the ending address at which data of the picture type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each picture type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In a preferred embodiment of the present invention, when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

According to this embodiment, since the amount of codes can be very accurately controlled, it is possible to make very low the possibility that actual coded data and the addresses will become inconsistent with each other.

In a preferred embodiment of the present invention, determination is made of a total amount of codes of the unit as a whole from the target amount of codes for each picture type.

Also, to attain the above object, according to another aspect of the present invention, there is provided a data coding method wherein input data in prescribed data units is classified into a picture type whose data items, are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding method comprising the steps of: determining an encoding rate; determining a fixed target amount of codes for each unit on the basis of the encoding rate; encoding the input data so that the coded data may be in conformity with the fixed target amount of codes for each unit; storing the encoded data temporarily; determining, on the basis of the encoding rate and the fixed target amount of codes, addresses of a reference unit for making a search and a prescribed number of units that are reproduced at least before and after the reference unit; determining, on the basis of the temporarily stored and encoded data, an ending address at which there is ended at least data of the picture type having its data items independently encoded, of the data within the unit and an ending address of prescribed reference data that is uniquely discriminated from a foremost position of the unit; constructing as the unit the coded data that has been obtained by being encoded so that the coded data may be in conformity with the target amount of codes; and depicting at a foremost position of the unit the addresses of the unit and the ending address at which data of the picture type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each picture type that corresponds to the encoding rate. Therefore, by, when performing encoding, making the thus determined values ones at which the quality of the signals becomes statistically the most excellent, it becomes possible, whatever the encoding rate may be like, to perform encoding while maintaining the quality of the signal to be at an optimum level.

In a preferred embodiment of the present invention, when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

According to this embodiment, since the amount of codes can be very accurately controlled, it is possible to make very low the possibility that actual coded data and the addresses will become inconsistent with each other.

Also, to attain the above object, according to still another aspect of the present invention, there is provided a data coding apparatus wherein input data in prescribed data units is classified into a picture type whose data items are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding apparatus comprising: encoding rate determining means for determining an encoding rate, target amount-of-code determining means for determining a target amount of codes for each picture type that corresponds to the encoding rate, amount-of-code control means for encoding the input data for each picture type so that the coded data may be in conformity with the target amount of codes, address determining means for determining, on the basis of the encoding rate and the target amount of codes, addresses of a reference unit for making a search and a prescribed number of units that are reproduced at least before and after the reference unit and an ending address at which there is ended at least data of the picture type having its data items independently encoded, of the data within the unit, unifying means for constructing as the unit the coded data that has been obtained by being encoded so that the coded data may be in conformity with the target amount of codes, and depicting means for depicting at a foremost position of the unit the addresses of the unit and the ending address at which data of the picture type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each picture type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In a preferred embodiment of the present invention, the amount-of-code control means comprises: temporary target amount-of-code producing means for producing a temporary amount of codes that has been prepared by setting the amount of codes to be at a value smaller by a prescribed amount of codes than the target amount of codes, and adjusting means for adjusting an amount of codes by adjusting the difference between an amount of codes generated by the encoding performed into the temporary target amount of codes and the target amount of codes by using invalid bits.

According to this embodiment, since the amount of codes can be very accurately controlled, it is possible to make very low the possibility that actual coded data and the addresses will become inconsistent with each other.

In another preferred embodiment, the amount-of-code control means determines a total amount of codes of the unit as a whole from the target amount of codes for each picture type.

In still another preferred embodiment, the target amount-of-code determining means has storage means having stored previously therein a target amount-of-code value for each picture type that corresponds to a prescribed encoding rate.

According to this preferred embodiment, it is possible to simplify the construction.

Also, to attain the above object, according to yet still another aspect of the present invention, there is provided a data coding apparatus wherein input data in prescribed data units is classified into a picture type whose data items are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding apparatus comprising: encoding rate determining means for determining an encoding rate; target amount-of-code determining means for determining a fixed target amount of codes for each unit on the basis of the encoding rate; amount-of-code control means for encoding the input data so that the coded data may be in conformity with the fixed target amount of codes for each unit; temporal storage means for temporarily storing the encoded data; address determining means for determining, on the basis of the encoding rate and the fixed target amount of codes, addresses of a reference unit for making a search and a prescribed number of units that are reproduced at least before and after the reference unit and also determining, on the basis of the temporarily stored and encoded data, an ending address at which there is ended at least data of the picture type having its data items independently encoded, of the data within the unit and an ending address of prescribed reference data that is uniquely discriminated from a foremost position of the unit; unifying means for constructing as the unit the coded data that has been obtained by being encoded so that the coded data may be in conformity with the target amount of codes, and depicting means for depicting at a foremost-position of the unit the addresses of the unit and the ending address at which data of the picture type having its data items independently encoded is ended.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each picture type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In a preferred embodiment of the present invention, the amount-of-code control means comprises: temporary target amount-of-code producing means for producing a temporary target amount of codes that has been prepared by setting the amount of codes to be at a value smaller by a prescribed amount of codes than the target amount of codes, and adjusting means for adjusting an amount of codes by adjusting the difference between an amount of codes generated by the encoding performed into the temporary target amount of codes and the target amount of codes by using invalid bits.

According to this embodiment, since the amount of codes can be very accurately controlled, it is possible to make very low the possibility that actual coded data and the addresses will become inconsistent with each other.

Also, to attain the above object, according to further aspect of the present invention, there is provided a data coding method wherein input data in units of prescribed data is encoded, comprising the steps of: determining an encoding rate; determining transition in the amount of occupation of a virtual buffer that corresponds to a decoding buffer that is used when decoding is performed; and encoding prescribed reference data of the input data so that the amount of occupation of the virtual buffer, prevailing at the point in time when encoding is performed, may converge into a prescribed value.

In a preferred embodiment of the present invention, the data coding method further comprises the steps of: determining a target amount of codes in units of the prescribed data in correspondence with the encoding rate; encoding the prescribed reference data so that the coded data may be in conformity with the target amount of codes that has been corrected according to the prescribed value into which the amount of occupation of the virtual buffer is made to converge; storing into within the unit the data that has been encoded as a row of packs that is to be reproduced within a prescribed period of time; determining, on the basis of the encoding rate, addresses of a reference unit for making a search and a prescribed number of units that are reproduced at least before and after the reference unit and an ending address at which the prescribed reference data within the unit is ended; and depicting the address of the unit and the ending address at which the prescribed reference data within the unit is ended at a foremost position of the unit.

According to the present invention, it is possible to record before the encoding is started the addresses for depicting the reproduction control message for reproducing the unit and the search message for making a search without requiring the use of an excessively large storage capacity of memory.

In addition, it is possible to determine the target amount of codes for each picture type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In another preferred embodiment, when encoding the prescribed reference data within the unit so that the coded data may be in conformity with the target amount of codes, the prescribed reference data is encoded so as for the coded data to conform to a temporary target amount of codes that has been set to be lower by a prescribed amount than the target amount of codes that has been corrected according to the prescribed value into which the amount of occupation of the virtual buffer is made to converge; and, by the use of invalid bits, adjustment is performed of the difference between the generated amount of codes, that has been generated by encoding performed in conformity with the temporary target amount of codes, and the target amount of codes that has been thus corrected, whereby the prescribed reference data is encoded so that the coded data may be in conformity with the target amount of codes.

According to this embodiment, since the amount of codes can be very accurately controlled, it is possible to make very low the possibility that actual coded data and the addresses will become inconsistent with each other.

Also, to attain the above object, according to still further aspect of the present invention, there is provided a data coding apparatus wherein input data in units of prescribed data is encoded, comprising: encoding rate determining means for determining an encoding rate; buffer transition observing means for determining transition in the amount of occupation of a virtual buffer that corresponds to a decoding buffer that is used when decoding is performed; and encoding control means for encoding prescribed reference data of the input data so that the amount of occupation of the virtual buffer, prevailing at the point in time when encoding is performed, may converge into a prescribed value.

In a preferred embodiment of the present invention, the data coding apparatus further comprises target amount-of-code calculating means for determining a target amount of codes in units of the prescribed data in correspondence with the encoding rate; target amount-of-code correcting means for correcting the target amount of codes according to the prescribed value into which the amount of occupation of the virtual buffer is made to converge; unifying means for storing the data that has been encoded into within the unit as a row of packs that is to be reproduced within a prescribed period of time; address determining means for determining, on the basis of the encoding rate, addresses of a reference unit for making a search and a prescribed number of units that are reproduced at least before and after the reference unit and an ending address at which the prescribed reference data within the unit is ended; and depicting means for depicting the address of the unit and the ending address at which the prescribed reference data within the unit is ended at a foremost position of this unit.

According to the present invention, it is possible to record before the encoding is started the addresses for depicting the reproduction control message for reproducing the unit and the search message for making a search without requiring the use of an excessively large storage capacity of memory. In addition, it is possible to determine the target amount of codes for each picture type that corresponds to the encoding rate. Therefore, by, when performing encoding, making the thus-determined values ones at which the quality of the signals becomes statistically the most excellent, it becomes possible, whatever the encoding rate may be like, to perform encoding while maintaining the quality of the signal to be at an optimum level.

In another preferred embodiment, when encoding the prescribed reference data within the unit so that the coded data may be in conformity with the target amount of codes, the prescribed reference data is encoded so as for the coded data to conform to a temporary target amount of codes that has been set to be lower by a prescribed amount than the target amount of codes that has been corrected according to the prescribed value into which the amount of occupation of the virtual buffer is made to converge; and, by the use of invalid bits, adjustment is performed of the difference between the generated amount of codes, that has been generated by encoding performed in conformity with the temporary target amount of codes, and the target amount of codes that has been thus corrected, whereby the prescribed reference data is encoded so that the coded data may be in conformity with the target amount of codes.

According to this embodiment, since the amount of codes can be very accurately controlled, it is possible to make very low the possibility that actual coded data and the addresses will become inconsistent with each other.

The nature, principle and utility of the invention will become more apparent from the following detailed description when read in conjunction with the accompanying drawings.

DESCRIPTION OF THE PREFERRED EMBODIMENTS

Embodiments of the present invention will now be explained with reference to the drawings.

Figure 4:
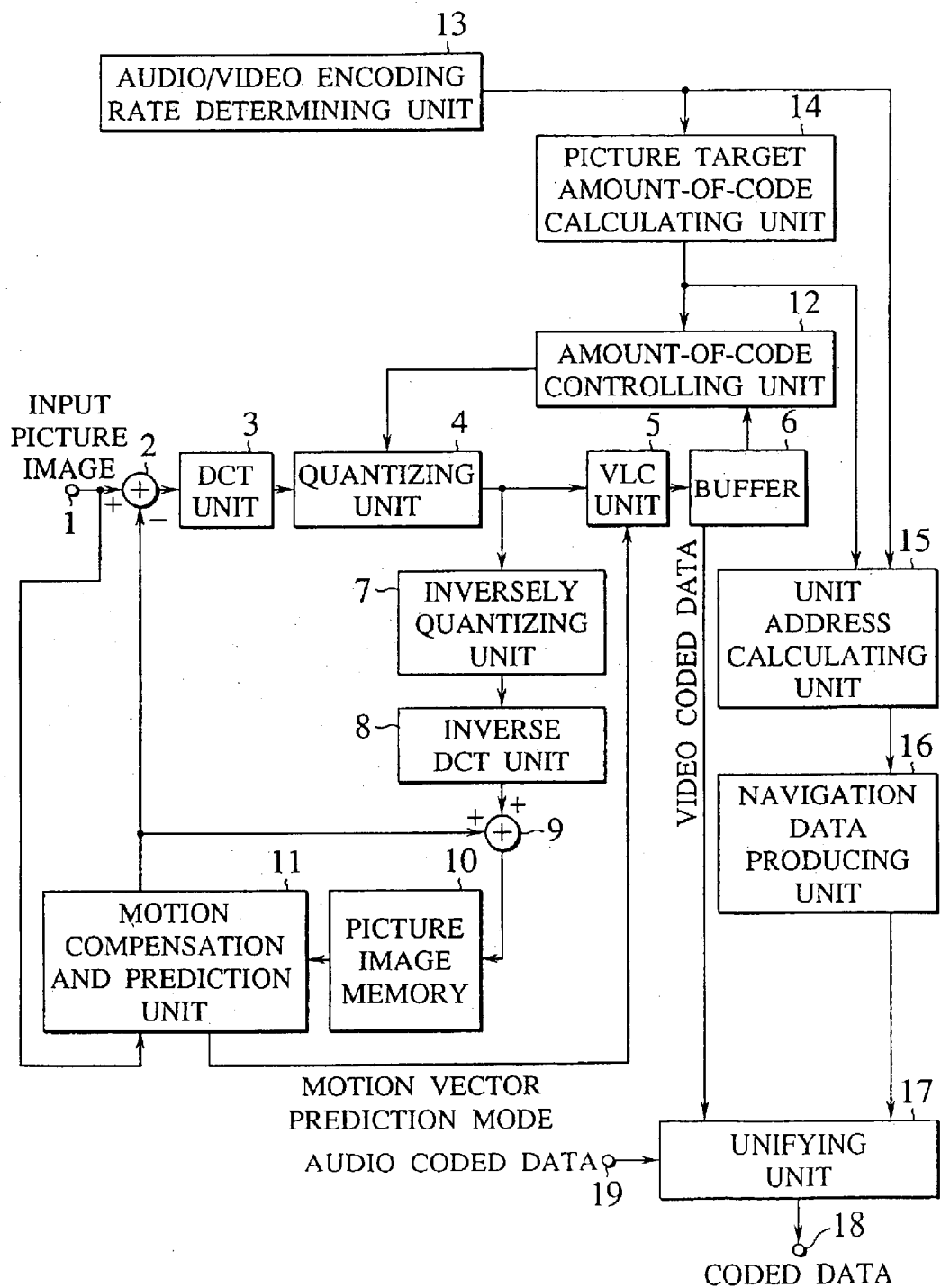
FIG. 4 is a block diagram illustrating a schematic construction of an audio/video encoding apparatus according to a first embodiment of the present invention.

FIG. 4 illustrates a schematic construction of an audio/video encoding apparatus according to a first embodiment to which a data coding method and an apparatus therefor of the present invention are applied. It is to be noted that in FIG. 4 illustration is made mainly of the construction of a video encoder for performing encoding of video data and no illustration is made of the construction of an audio encoder for performing encoding of audio data.

In this FIG. 4, an input picture image signal is supplied to an input terminal 1 and this input picture image signal is sent to a calculating unit 2 and a motion compensation and prediction unit 11.

In the calculating unit 2, a difference between the picture image signal that has been obtained by decoding performed by the motion compensation and prediction unit 11 and the input picture image signal is determined, and this differential picture image signal is sent to a DCT unit 3. It is to be noted that the input picture image signals of which the differential picture image signal is encoded are only of the P-picture and B-picture type and that, in a case where the input picture image signal is of the I-picture, this signal is encoded as is. However, in the following description, an explanation will be given of the case where a differential picture image signal is encoded, as an example.

In a DCT unit 3, the differential picture image signal that has been supplied from the calculating unit 2 is subjected to orthogonal, transformation. Data (DCT coefficient) that has been obtained by DCT performed in the DCT unit 3 is sent to a quantizing unit 4.

In the quantizing unit 4, the DCT coefficient from the DCT unit 3 is quantized and the thus-quantized data is sent to a variable length encoding (VLC) unit 5.

In the VLC unit 5, the quantized data from the quantizing unit 4 is variable-length-encoded. Also, to the VLC unit 5 there are also supplied the motion vector and prediction mode from the motion compensation and prediction unit 11, whereby the VLC unit 5 outputs, together with the variable length encoded data, the motion vector data and the prediction mode data, as additional messages to a macroblock. Data that has been obtained by the variable length encoding performed in the VLC unit 5 is temporarily stored in a buffer memory 6 and thereafter is read out from the buffer 6 at a prescribed transfer rate. The thus-read-out data is sent as video encoded data to a unifying unit 17 as later described.

Also, the amount of codes generated in macroblock units, of the video encoded data that is output from the buffer memory 6 is sent to an amount-of-code control unit 12. The amount-of-code control unit 12 determines an error amount of codes that is a difference between the amount of codes generated in macroblock units and a picture target amount of codes as later described to thereby produce an amount-of-code control signal that corresponds to the error amount of codes and feed it back to the quantizing unit 4, thereby performing control of the amount of codes generated. The amount-of-code control signal that is fed back to the quantizing unit 4 for controlling the amount of codes is a signal that is for the purpose of controlling the quantizing scale in the quantizing unit 4.

On the other hand, the picture image data that has been quantized is also sent to an inversely quantizing unit 7.

The inversely quantizing unit 7 performs inverse quantization of the quantized data from the quantizing unit 4. The DCT coefficient data that has been obtained by this inverse quantization is sent to an inverse DCT unit 8.

The inverse DCT unit 8 performs inverse DCT processing of the DCT coefficient data from the inversely quantizing unit 7 and thereafter sends the resulting data to a calculating unit 9.

The calculating unit 9 performs addition between the predicted differential picture image from the motion compensation and prediction unit 11 and the signal from the inverse DCT unit 8. As a result of this, the picture image signal is restored. The thus-restored picture image signal is stored temporarily into a picture image memory 10 and then is sent to the motion compensation and prediction unit 11. The picture image signal that has been sent from the picture image memory 10 to the motion compensation and prediction unit 11 is used to produce a decoded picture image serving as a reference for calculating the differential picture image in the calculating unit 2.

The motion compensation and prediction unit 11 detects the motion vector from the input picture image signal and, after shifting the picture image by the extent corresponding to the movement of the thus-detected motion vector, performs prediction. The predicted differential picture image signal that has been obtained by this prediction is sent to the calculating unit 2 and the calculating unit 9. Also, the motion vector that has been detected in the motion compensation and prediction unit 11 is sent to the VLC unit 5 together with the prediction mode (MC mode) message.

Figure 1:
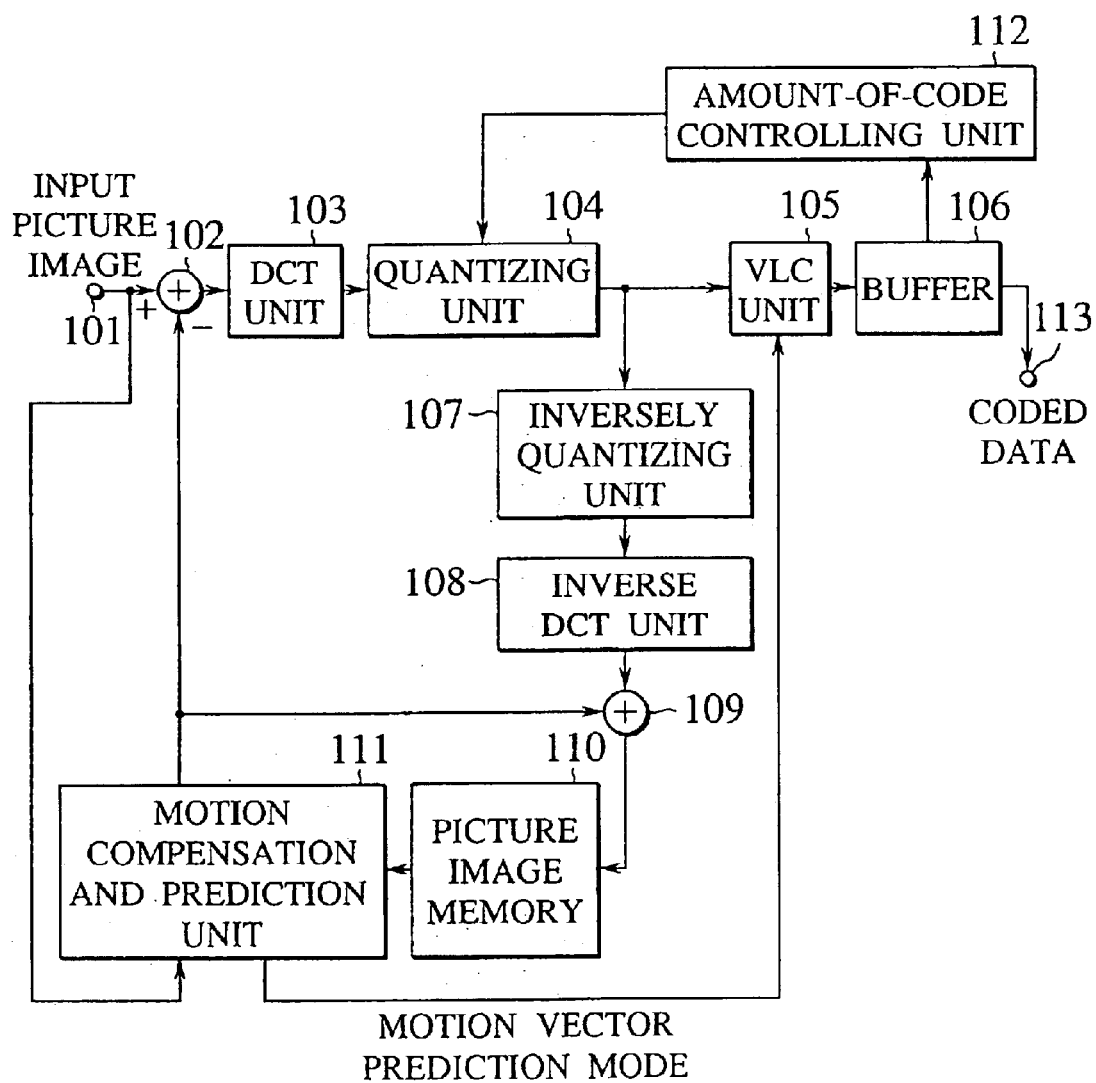
FIG. 1 is a block diagram illustrating a schematic construction of a conventional video encoder.
Figure 2:
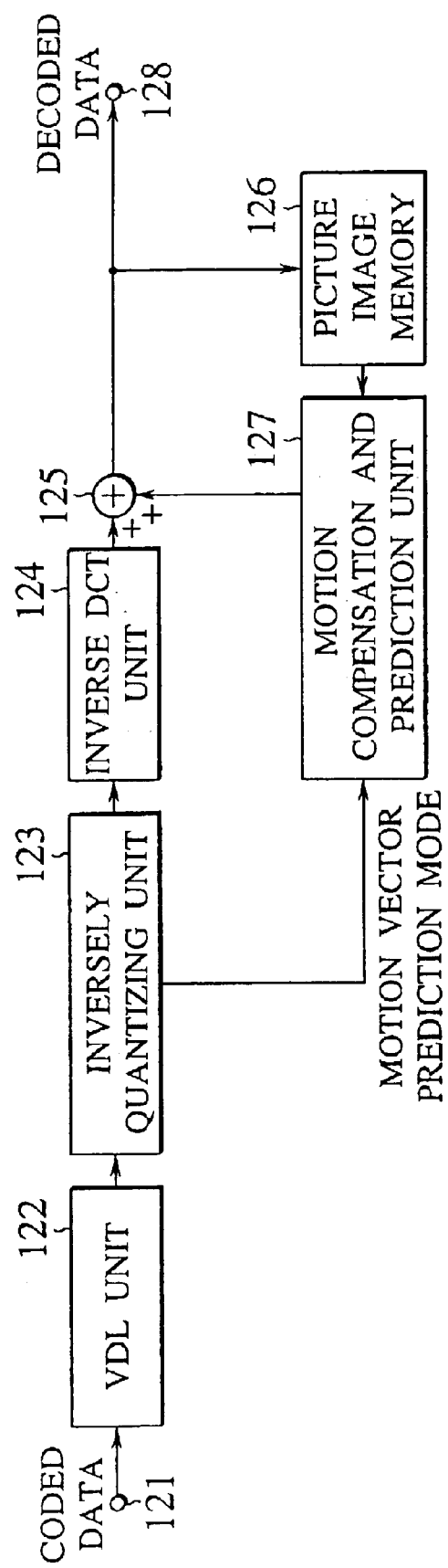
FIG. 2 is a block diagram illustrating a schematic construction of a conventional video decoder.

Although the construction that has been described up to here is substantially the same as that illustrated in FIG. 1, the audio/video encoding apparatus according to the first embodiment of the present invention further has the following construction.

In an audio/video encoding rate determining unit 13, the audio and video encoding rates of the audio and video signals that are to be encoded from now onward are determined. It is to be noted that the encoding rates for audio and video signals may be determined by a user or may automatically be set. The thus-determined encoding rate messages are sent to a picture target amount-of-code calculating unit 14 and a unit-address-calculating unit 15.

The picture target amount-of-code calculating unit 14 calculates a target amount of codes for each picture type defined in the MPEG system, according to the encoding rate message that has been supplied from the audio/video rate determining unit 13.

Assuming that, for example, the target amount of codes of the I-picture type signals is represented by T(I), the target amount of codes of the P-picture type signals is represented by T(P), and the target amount of codes of the B-picture type signals is represented by T(B), and that the GOP interior has a construction wherein I-picture is one piece, P-picture is 4 pieces, and B-picture is 15 pieces, the calculation equations for these picture target amounts of codes are as expressed in, for example, the following equations (1)–(3), provided, however, that the N in each equation is a video transfer rate (Mbps).

$$T(I) = 100 \times N(k \text{ bits}) \quad (1)$$

$$T(P) = 40 \times N(k \text{ bits}) \quad (2)$$

$$T(B) = 24 \times N(k \text{ bits}) \quad (3)$$

The picture target amount-of-code calculating unit 14 determines the target amount of codes of each picture type by the use of the calculation equations that are expressed as in the above equations (1)–(3).

The picture target amount-of-code messages that have thus been determined are transmitted to the amount-of-code controlling unit 12 and the unit address calculating unit 15.

Figure 5:
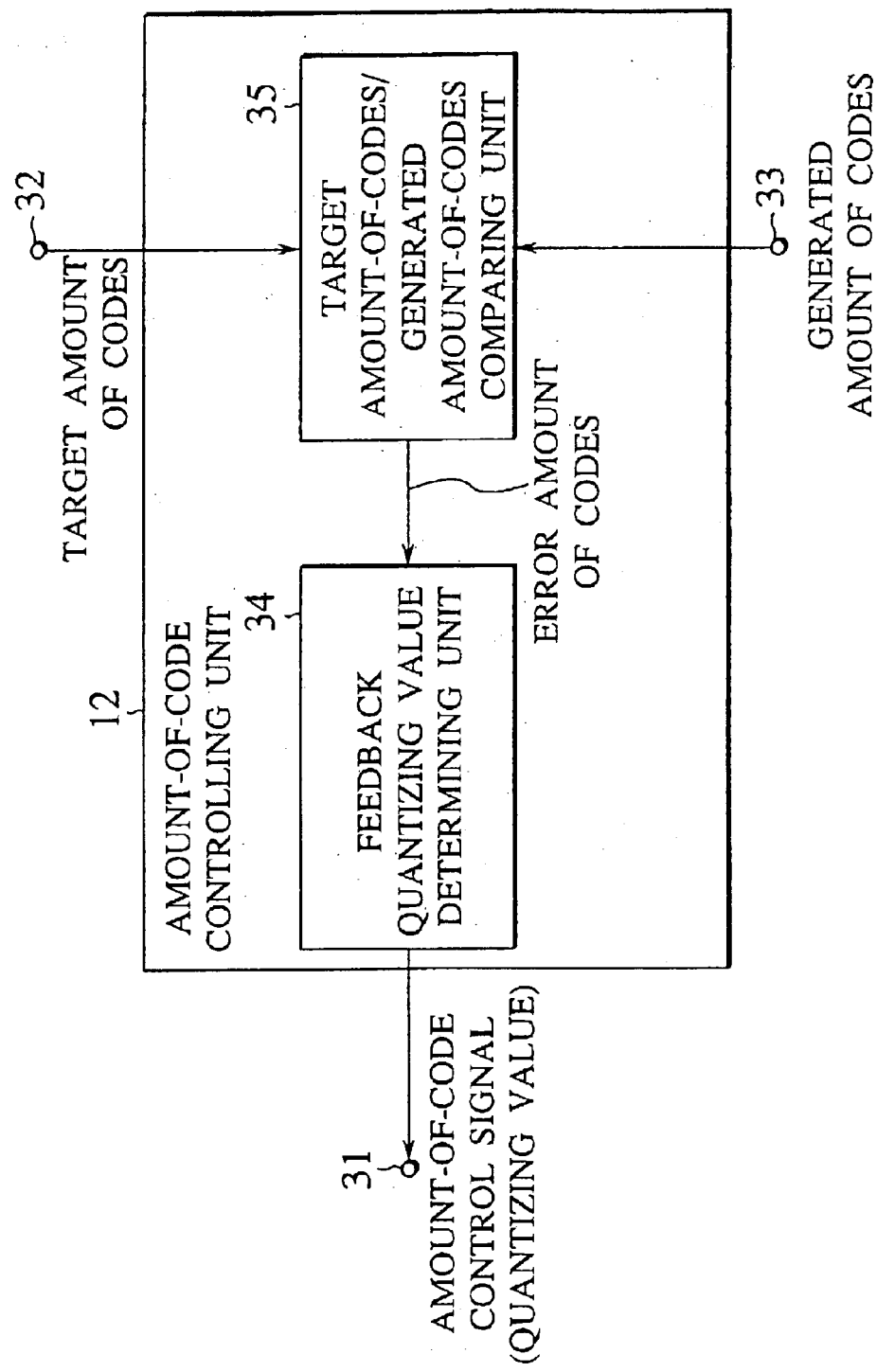
FIG. 5 is a block diagram illustrating a concrete construction of an amount-of-code control unit of the audio/video encoding apparatus according to the first embodiment of the present invention.

Here, the processing that is performed in the amount-of-code controlling unit 12 in the audio/video encoding apparatus according to the first embodiment will hereafter be explained using FIG. 5.

In this FIG. 5, to a terminal 33 of the amount-of-code controlling unit 12 there is input a generated amount-of-code message in microblock units that is output from the buffer memory 6. Also, to a terminal 32 there is input a picture target amount-of-code message that has been determined in the picture target amount-of-code calculating unit 14. And from a terminal 31 there is output an amount-of-code control signal (a signal for controlling the quantizing scale, i.e., quantizing value) with respect to the quantizing unit 4.

In a target amount-of-code/generated amount-of-code comparing unit 35, comparison is made between the generated amount of codes that has been supplied from the buffer memory 6 through the terminal 33 and the target amount of codes that has been supplied from the picture target amount-of-code calculating unit 14 through the terminal 32, thereby producing an error amount of codes that is a difference between the picture target amount of codes and the generated amount of codes. This error amount-of-code message is sent to a feedback quantizing-value determining unit 34.

The feedback quantizing-value determining unit 34 accumulates, for example, the error amount of codes for a prescribed period of time and, when this error amount of codes indicates that the generated amount of codes is larger than the picture target amount of codes, sets the amount-of-code control signal so that the quantizing value may become large in proportion to this error amount of codes (makes the quantizing scale large). On the other hand, when the error amount of codes indicates that the generated amount of codes is smaller than the picture target amount of codes, the unit 34 sets the amount-of-code control signal so that the quantizing value may become small in proportion to this error amount of codes (makes the quantizing scale small). As a result of this, the amount of codes of each picture type is controlled to the target amount of codes that has been determined.

Turning back to FIG. 4, the picture target amount-of-code message that has been calculated by the picture target amount-of-code calculating unit 14 and the encoding rate message that has been determined by the audio/video encoding rate determining unit 13 are sent to the unit address calculating unit 15.

Figure 6:
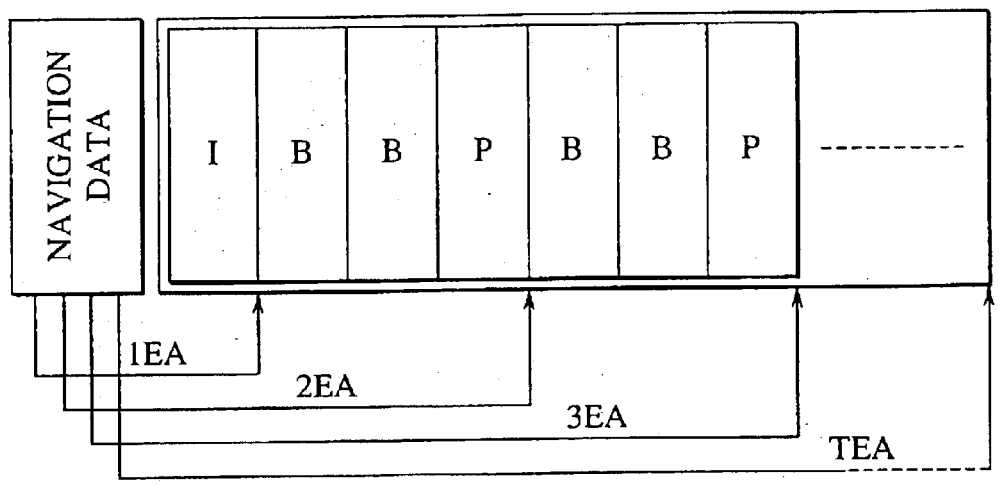
FIG. 6 is an explanatory diagram illustrating calculated contents of a unit address calculating unit.

In the unit address calculating unit 15, as shown in FIG. 6, an address TEA, address 1EA, address 2EA and so on are calculated as expressed in the following equations (4)–(6) by the use of the picture target amount-of-code message that has been calculated for each picture type by the picture target amount-of-code calculating unit 14 and the encoding rate message that is sent from the audio/video encoding rate determining unit 13, namely by using a Video Rate (kbps) and an Audio Rate (kbps). It is to be noted here that the address TEA is the addresses of a prescribed number of video object units that are reproduced at least before and after a video object unit for making a search with this object unit being used as a reference. Also, the address 1EA is the ending address of data that is capable of constituting the I-picture within the video object unit. Further, the address 2EA is the ending address of data that is capable of constituting the first P-picture within the video object unit.

$$TEA = (\text{Video Rate} + \text{Audio Rate}) \times 15/29.97 \quad (4)$$

$$1EA = T(I) + \text{Audio Rate} \times 1/29.97 \quad (5)$$

$$2EA = T(I) + 2 \times T(B) + T(P) + \text{Audio Rate} \times 4/29.97 \quad (6)$$

where the unit of measure is k (killo-) bit. Also, here, it is assumed that it is already known that the video object unit constitutes exactly a 1 GOP with 15 frames and the B-picture existing between the I- and P-pictures is 2 pieces. Also, although it is assumed that audio data is transferred at a fixed transfer rate, that is, the number of samples per unit of time is fixed, if encoding of audio data is performed by variable length encoding, relevant calculation has only to be performed considering the amount of codes of the audio data that exists at a position corresponding to video data (i.e., that corresponds to a time at which the video data is output). Such a relevant calculation is possible by equipping the apparatus with the picture target amount-of-code calculating unit 14 or a target amount-of-code memory as later described for the purpose of using it for audio data.

As described above, according to the audio/video encoding apparatus of this embodiment, it is possible to calculate the amount of codes up to a position until which calculation is necessary and accordingly to calculate the addresses of the video object units. These calculated messages are sent to a navigation-data-producing unit 16.

The navigation data producing unit 16 determines this video object unit as being the 0-th unit as viewed in the sequential order of reproduction. And using this video object unit as a reference unit, the video object units that are reproduced up and back to the 15th units in the sequential order of reproduction, the ±20th, ±30th, ±60th, ±120th, and ±240th video object units, at least, as viewed in the sequential order of reproduction, have their addresses calculated by making the address scalar-fold if necessary, whereby the unit 16 lays them out in a prescribed sequential order of reproduction and sends them to the unifying unit 17.

Figure 3:
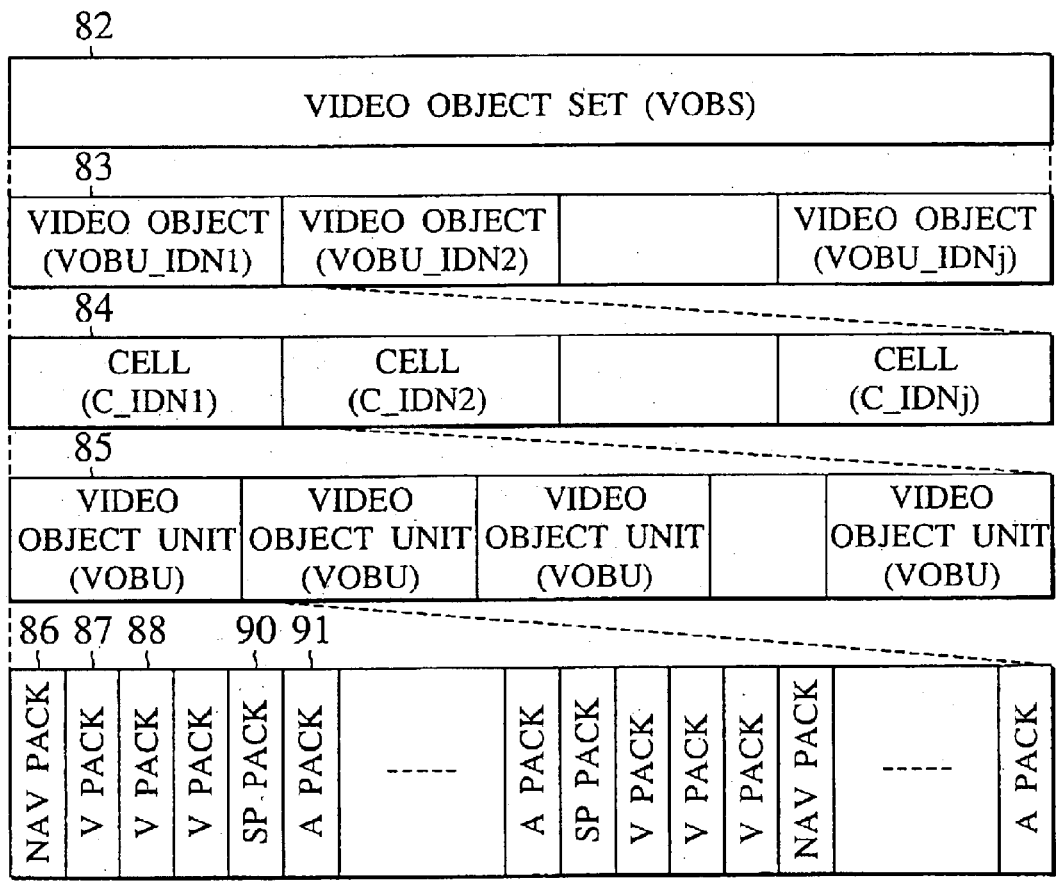
FIG. 3 is an explanatory diagram illustrating the construction of a video object set in which video object units and navigation data are disposed.

The unifying unit 17 produces such video object units as have been explained in FIG. 3, by using the audio encoded data supplied from the terminal 19, video encoded data supplied from the buffer memory 6, and navigation data supplied from the navigation data producing unit 16, and outputs the encoded data that has been unified therein.

Namely, the unifying unit 17 packets (packs) the navigation data that has been transmitted thereto, packets (packs) the video encoded data, audio encoded data, etc., and disposes the packet of the navigation data (the navigation pack) at the foremost position, thereafter disposes the packet of the video data (the video pack), the packet of the audio data (the audio pack), etc., thereby produces a prescribed one video object unit, and sends this one video object unit. When the unifying unit 17 has finished transmission of the one video object unit, the unifying unit 17 receives navigation data for use in the production of a next video object unit and similarly unifies it. The encoded data that has been thus unified is output from the output terminal 18.

As has been described above, in the audio/video encoding apparatus according to the first embodiment of the present invention, it becomes possible to record, before the encoding is started, the navigation data that represents the reproduction control message for making a reproduction of the video object unit and the search message for making a search, without having a memory that would be unnecessary.

Also, in the audio/video encoding apparatus of this first embodiment, since it is possible to determine the target amount-of-code value in picture type units that corresponds to the encoding rate value, by, when performing the MPEG encoding of those values, making these values the values at which the quality of the picture image becomes statistically the best, the encoding becomes able to be performed while maintaining the quality of the picture image to be at an optimum level whatever the encoding rate may be like.

Figure 7:
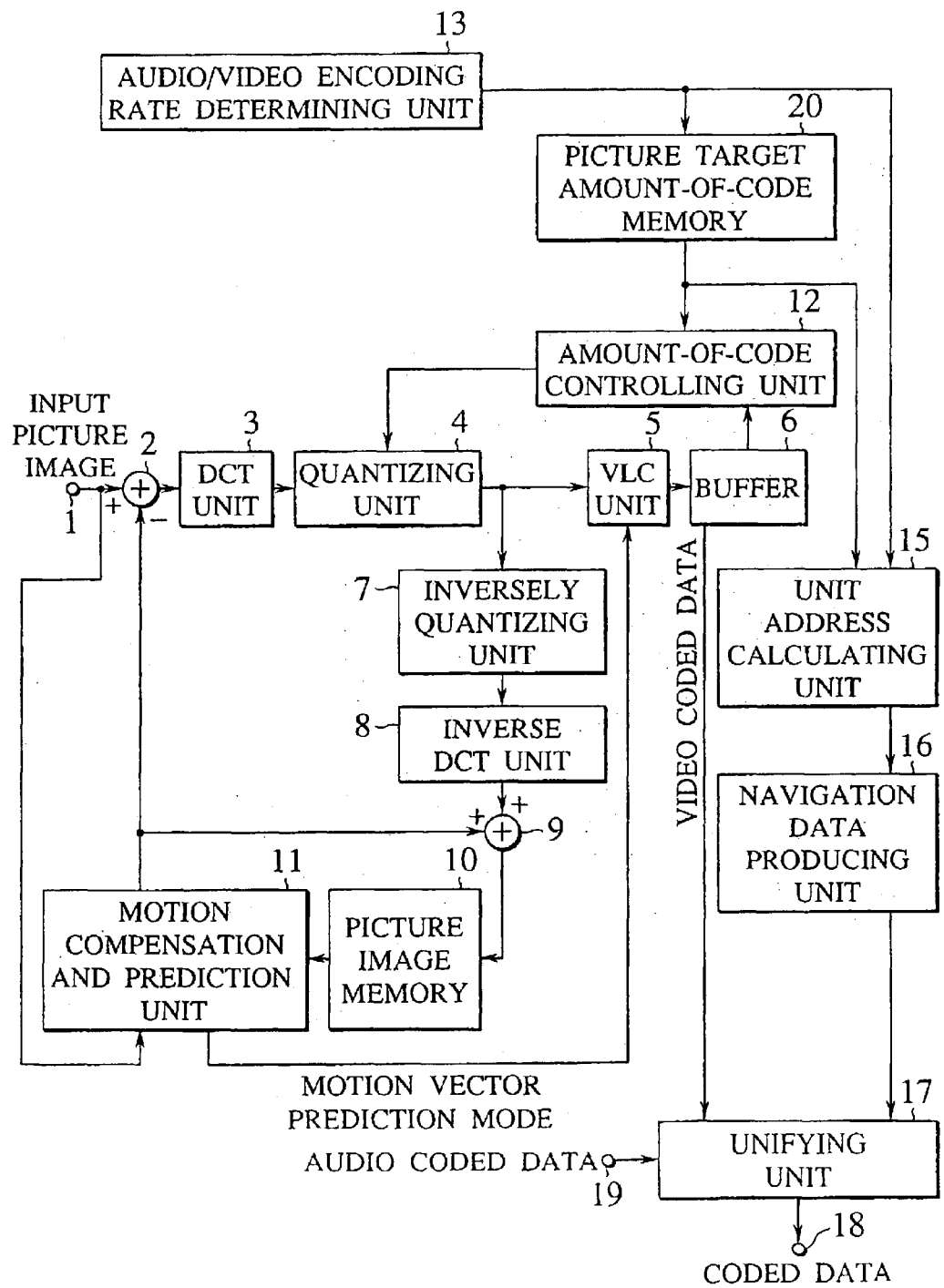
FIG. 7 is a block diagram illustrating a schematic construction of an audio/video encoding apparatus according to a second embodiment of the present invention.

Next, FIG. 7 illustrates a schematic construction of the audio/video encoding apparatus according to a second embodiment of the present invention. It is to be noted that, in the audio/video encoding apparatus illustrated in this FIG. 7, the same constituent elements as those in FIG. 4 are denoted by like reference symbols and an explanation thereof is omitted by making only an explanation of the constituent elements different from those in FIG. 4.

In the audio/video encoding apparatus according to the second embodiment illustrated in this FIG. 7, instead of the picture target amount-of-code calculating unit 14 of FIG. 4 there is provided a memory (picture target amount-of-code memory 20) that has recorded previously therein a table that has the target amount-of-code value in picture type units that corresponds to a prescribed encoding rate (transfer rate). Also, the audio/video amount-of-code rate determining unit 13 in the case of this second embodiment outputs eight kinds of rate messages that have been prepared by selecting the values from 1 M(mega)bps to 8 Mbps in units of 1 Mbps as the amount-of-code messages, and supplies them to the picture target amount-of-code memory 20.

Accordingly, from the picture target amount-of-code memory 20 there is output the target amount-of-code value in picture type units that corresponds to the rate message that has been obtained by any one of the eight kinds of rate messages being selected by the audio/video amount-of-code rate determining unit 13.

Table 1 shows an example of the table that has eight kinds of encoding rates (transfer rates) and the target amount-of-code values in picture type units that correspond thereto. Namely, the table on this Table 1 represents, in correspondence with the respective encoding rates (transfer rates) of eight kinds, the target amount of codes of the I-, P-, and B-pictures that has been set in an amount-of-code ratio according to which a general moving picture image in a case where the same has been encoded by the MPEG system becomes statistically the best in quality (S/N). It is to be noted that the picture target amount-of-code memory 20 may be a ROM which has stored therein the table of the Table 1.

TABLE 1

| Transfer rate | Type | | |
|---|---|---|---|
| | I-Picture | P-Picture | B-Picture |
| 1.0 Mbps | 100 kbit | 40 kbit | 24 kbit |
| 2.0 Mbps | 200 kbit | 80 kbit | 48 kbit |
| 3.0 Mbps | 300 kbit | 120 kbit | 72 kbit |
| 4.0 Mbps | 400 kbit | 160 kbit | 96 kbit |
| 5.0 Mbps | 450 kbit | 200 kbit | 125 kbit |
| 6.0 Mbps | 475 kbit | 260 kbit | 148 kbit |
| 7.0 Mbps | 500 kbit | 300 kbit | 180 kbit |
| 8.0 Mbps | 525 kbit | 340 kbit | 211 kbit |

According to the audio/video encoding apparatus of this second embodiment, the same effects as those attainable with the audio/video encoding apparatus of the first embodiment are not only brought about but, because no calculation is needed of the picture target amount of codes, it is possible to achieve the simplification of the construction.

Figure 8:
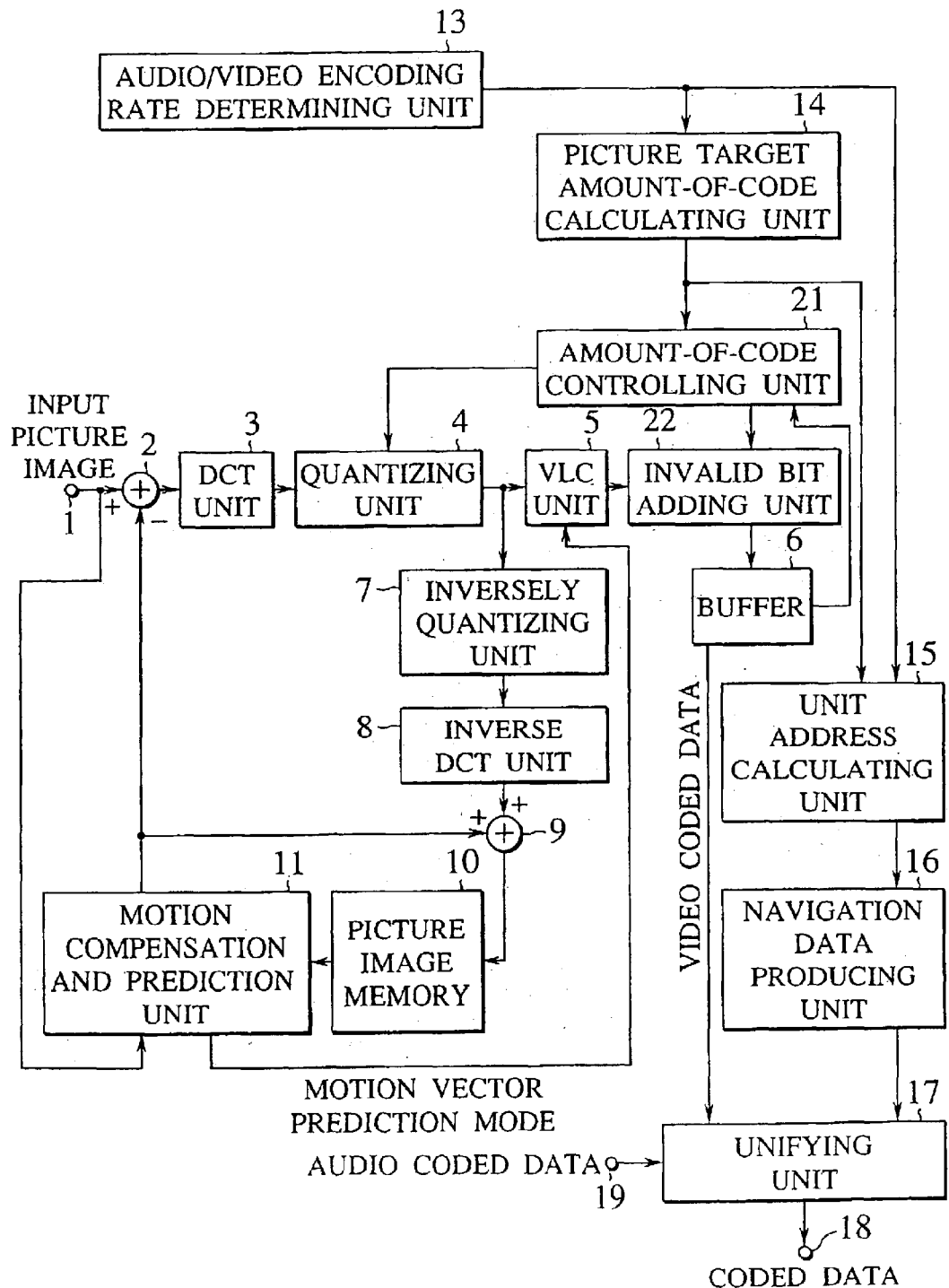
FIG. 8 is a block diagram illustrating a schematic construction of an audio/video encoding apparatus according to a third embodiment of the present invention.
Figure 9:
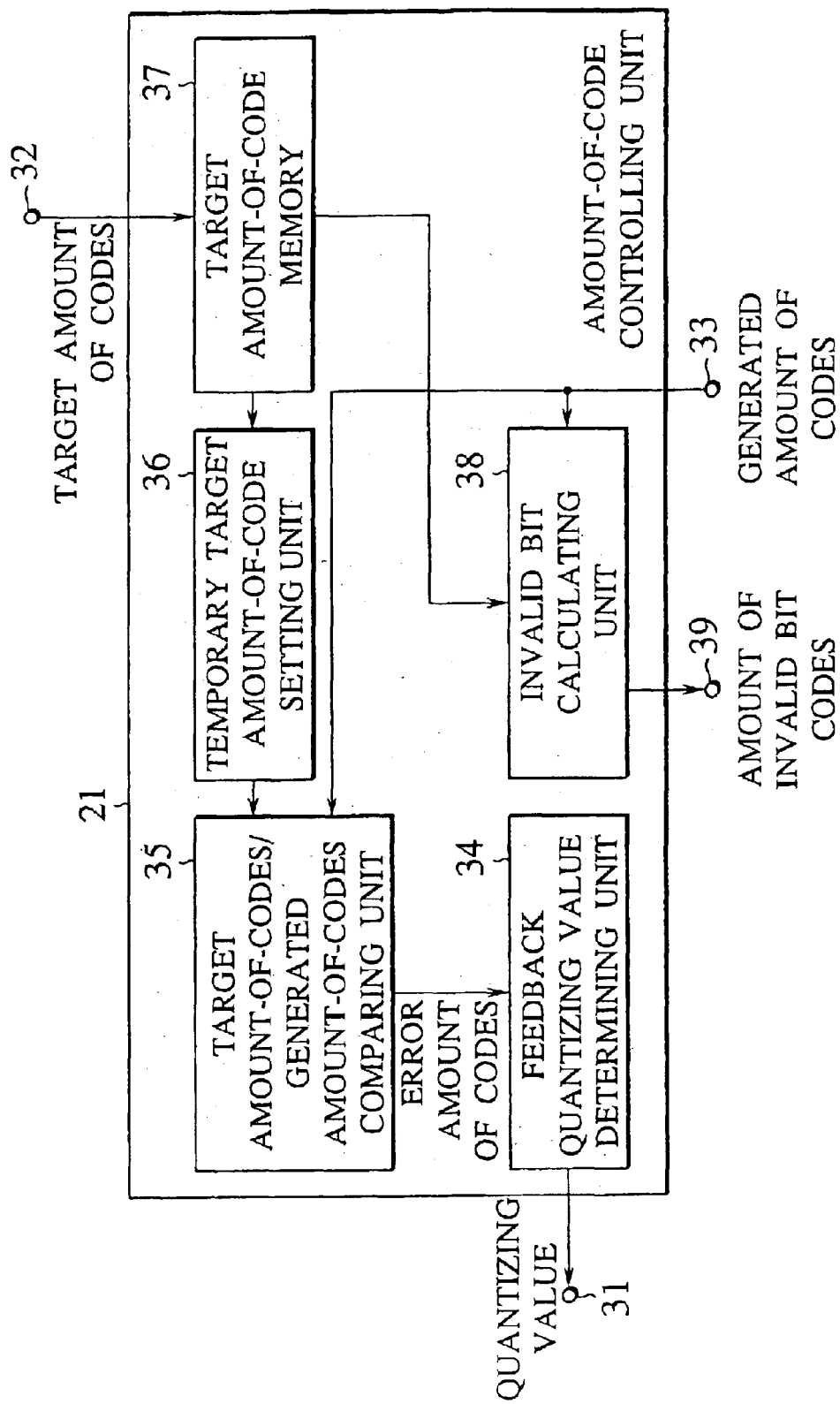
FIG. 9 is a block diagram illustrating a concrete construction of an amount-of-code control unit of the audio/video encoding apparatus according to the third embodiment of the present invention.

Next, FIG. 8 illustrates a schematic construction of the audio/video encoding apparatus according to a third embodiment of the present invention. Also, FIG. 9 illustrates a schematic construction of an amount-of-code controlling unit 21 of the audio/video encoding apparatus according to this third embodiment. It is to be noted that in FIGS. 8 and 9 the same constituent elements as those in FIGS. 4 and 5 are denoted by like reference symbols and an explanation thereof is omitted and only the constituent elements that are different from those in FIGS. 4 and 5 are explained.

In the audio/video encoding apparatus according to the third embodiment illustrated in FIG. 8, an invalid bit adding unit 22 as later described is provided between the VLC unit 5 and the buffer memory 6 and, in addition, the amount-of-code controlling unit 21 has a construction such as that illustrated in FIG. 9.

In the amount-of-code controlling unit 21 illustrated in FIG. 9, the generated amount-of-code message that has been supplied from the buffer memory 6 through the terminal 33 is sent to a target amount-of-code/generated amount-of-code comparing unit 35 and simultaneously is sent to the invalid bit calculating unit 38, too. Also, the picture target amount-of-code message that has been supplied from the picture target amount-of-code calculating unit 14 through the terminal 32 is sent to a target amount-of-code memory 37.

The target amount-of-code memory 37 temporarily accumulates the picture target amount-of-code message that has been supplied through the terminal 32 and thereafter read it out and supplies it to the temporary target amount-of-code setting unit 36 and the invalid bit calculating unit 38.

The temporary target amount-of-code setting unit 36 sets as a temporary picture target amount of codes the value that is approximately 10% or so smaller than the value of the picture target amount of codes that has been supplied from the target amount-of-code memory 37. This temporary picture target amount of codes is sent to the target amount-of-code/generated amount-of-code comparing unit 35.

Accordingly, in the case of this FIG. 9, the target amount-of-code/generated amount-of-code comparing unit 35 compares the generated amount of codes that has been supplied from the buffer memory 6 through the terminal 33 and the temporary picture target amount of codes that has been set by the temporary target amount-of-code setting unit 36 to thereby produce an error amount of codes that is an error or difference between the temporary picture target amount of codes and the generated amount of codes. This error amount-of-code message is sent to the feedback quantizing value determining unit 34.

The feedback quantizing value determining unit 34 accumulates the error amount of codes for a prescribed period of time and, in a case where this error amount of codes indicates that the generated amount of codes is larger than the temporary picture target amount of codes, sets the amount-of-code control signal so that the quantizing value may become large in proportion to the error amount of codes (makes the quantizing scale large). On the other hand, in a case where the error amount of codes indicates that the temporary picture target amount of codes is larger than the generated amount of codes, the unit 34 sets the amount-of-code control signal so that the quantizing value may become small in proportion to the error amount of codes (makes the quantizing scale small). By doing so, the amount of codes of each picture type is controlled to the temporary picture target amount of codes that has been determined.

The invalid bit calculating unit 38 adds, at the point in time when the encoding of the 1 picture data has been finished, the generated amount of codes in macroblock units that has been input beforehand from the buffer memory 6, thereby calculating the difference between a total generated amount of codes and picture target amount of codes of the 1 picture data. Then, the unit 38 outputs the amount of codes corresponding to the difference, as invalid bit amount-of-code message. This invalid bit amount-of-code message is sent to the invalid bit adding unit 22 of FIG. 8 through the terminal 39.

The invalid bit adding unit 22 of FIG. 8 adds to the encoded data that has been supplied thereto from the VLC unit 5 the invalid bits that correspond to the invalid bit amount-of-code message from the amount-of-code controlling unit 21. As a result of this, the data output from the invalid bit adding unit 22 becomes data that has been accurately controlled to the picture target amount of codes, and this encoded data is sent to the buffer memory 6.

According to the audio/video encoding apparatus of this third embodiment, the same effects as those attainable with the audio/video encoding apparatus of the first embodiment are not only obtained but, since the amount of codes can be controlled very accurately, it is possible to lessen the possibility very much that the contents of the navigation data and the actual amount of encoded data will become inconsistent with each other.

Figure 10:
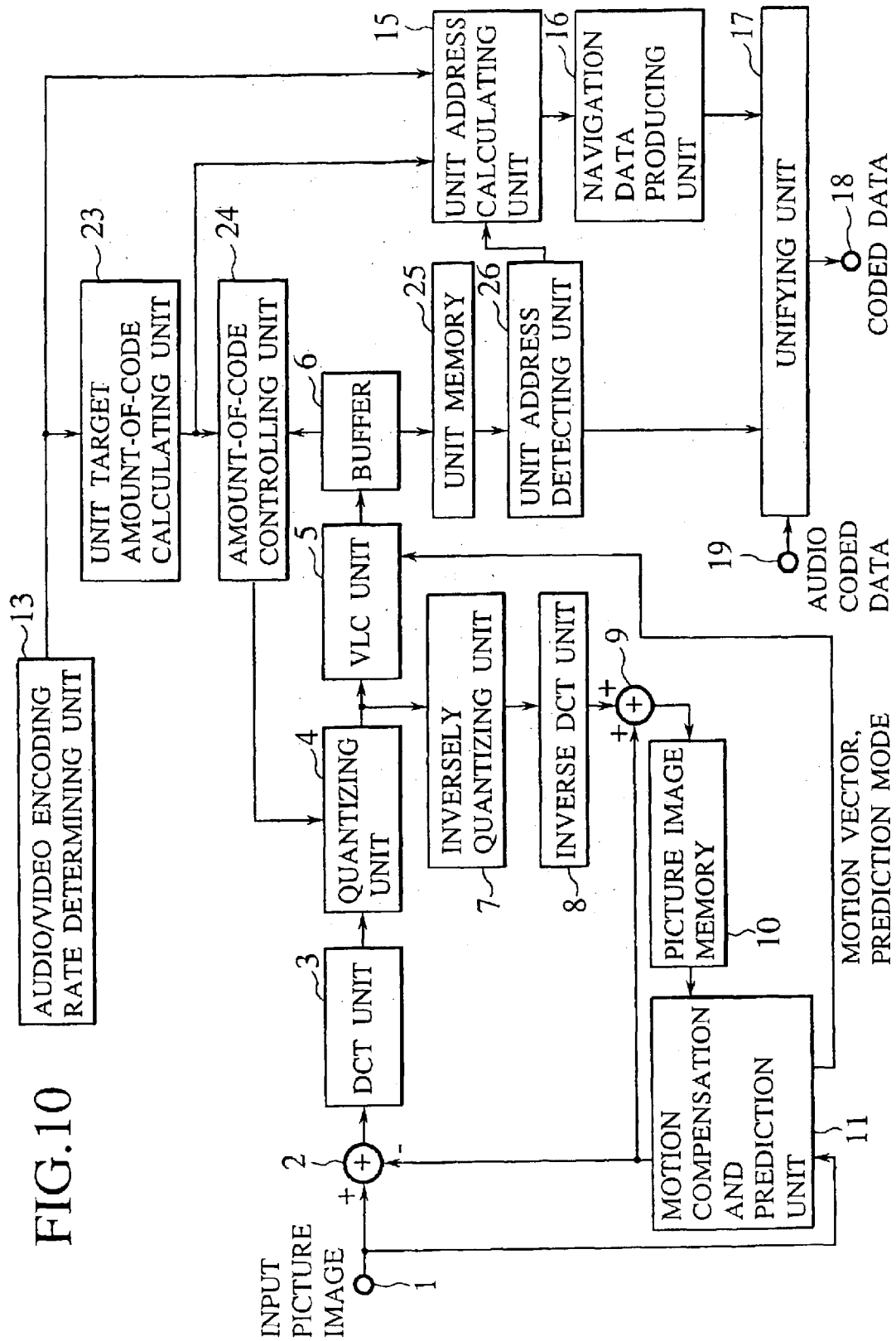
FIG. 10 is a block diagram illustrating a schematic construction of an audio/video encoding apparatus according to a fourth embodiment of the present invention.

Next, FIG. 10 illustrates a schematic construction of the audio/video encoding apparatus according to a fourth embodiment of the present invention. It is to be noted that, in this FIG. 10, the same constituent elements as those in FIG. 4 are denoted by like reference symbols and an explanation thereof is omitted by making only an explanation of the constituent elements different from those in FIG. 4.

This audio/video encoding apparatus according to the fourth embodiment, illustrated in FIG. 10 has provided therein a unit memory 25 and a unit address detecting unit 26, that will be later described. The video coded data that has been output from the buffer memory 6 is thereby sent to the unit memory 25. Also, instead of the picture target amount-of-code calculating unit 14, illustrated in FIG. 4, that calculates the target amount of codes every picture, the audio/video encoding apparatus according to the fourth embodiment has provided therein a unit target amount-of-code calculating unit 23 that calculates a substantially fixed amount of codes in units of a video object unit according to the encoding rate that has been determined by the audio/video encoding rate determining unit 13. Also, instead of the amount-of-code controlling unit 12 illustrated in FIG. 4, the encoding apparatus has provided therein an amount-of-code controlling unit 24 that controls the amount of codes in such a way as to be later described.

In this FIG. 10, the unit target amount-of-code calculating unit 23 calculates a substantially fixed target amount of codes in units of a video object unit according to the encoding rate message from the audio/video encoding rate determining unit 13.

Assuming, for example, that T(U) represents the unit target amount of codes; 1 video object unit have 1 GOP; and 1 GOP have 15 frames, since this 1 video object unit corresponds to 0.5 second when viewed from the aspect of time, the calculation equation of the unit target amount of codes T(U) is as expressed by, for example, the following equation (7). Provided, however, that the N in the equation represents the transfer rate(Mbps).

$$T(U)=N/2(M \text{ bits}) \tag{7}$$

In the unit target amount-of-code calculating unit 23, in accordance with the calculation performed using the equation (7), there is determined the target amount of codes in units of a video object unit.

The unit target amount of codes that has been determined in this way is transmitted to the amount-of-code controlling unit 24.

The basic construction of the amount-of-code controlling unit 24 is almost the same as that of FIG. 5 in the above-described first embodiment, but the operation thereof is performed as follows. The operation of the amount-of-code controlling unit 24 in the case of the fourth embodiment will now be explained by the use of the above-described FIG. 5.

In the case of this fourth embodiment, to the terminal 32 of FIG. 5, there is input a substantially fixed target amount of codes message on and in units of a video object unit, that has been determined in the unit target amount-of-code calculating unit 23. This substantially fixed target amount of codes message on and in units of a video object unit is input to the target amount-of-code/generated amount-of-code comparing unit 35 of FIG. 5.

Here, in the case of this fourth embodiment, the amount-of-code controlling unit 24 calculates a target amount of codes on and in units of a picture according to the substantially fixed target amount of codes message on and in units of a video object unit, and further controls the generated amount of codes according to the target amount of codes on and in units of a picture.

An explanation will now be given of the operational flow of the amount-of-code controlling unit 24 that includes the calculation of the target amount of code in units of a picture, based on the substantially fixed target amount of codes obtained every video object unit, and the control of the generated amount of codes.

First, in the amount-of-code controlling unit 24, as a first step, distribution of the amount of codes with respect to each picture is performed according to the substantially fixed target amount of codes obtained every video object unit.

Concretely explaining, in the amount-of-code controlling unit 24, as a first step, on the basis of the target amount of codes R with respect to the pictures that have not been encoded yet within the GOP and that include the pictures each as an object to be encoded, distribution is performed of the target amount of codes with respect to each picture within the GOP. This distribution is repeatedly performed in the sequential order of the pictures each as an object to be encoded within the GOP. At this time, the target amount of codes with respect to each picture is set by the use of the two assumptions that follows.

As the first assumption, it is assumed that the product of the average quantizing scale, that is used when each picture is encoded, and the generated amount of codes become a constant value every picture type so long as no change occurs in the image screen. After having encoded each picture, prescribed weighting parameters (for example, the weighting parameters indicating the complexity of the image screen) Xi, Xp, and Xb that are each used every picture type are renewed in accordance with the following equations (8) to (10).

$$Xi = Si \times Qi \quad (8)$$

$$Xp = Sp \times Qp \quad (9)$$

$$Xb = Sb \times Qb \quad (10)$$

It is to be noted here that in these equations the i represents the I picture; the p represents the P picture; and the b represents the B picture. Also, in these equations, the Si, the Sp, and the Sb each represent the generated amount of codes that corresponds to the encoded result of a corresponding picture which is one before each picture. The Qi, the Qp, and the Qb each represent the average quantizing scale that is used when each picture is encoded. Namely, the weighting parameters Xi, Xp, and Xb are each defined as being the product of the generated amount of codes S that corresponds to the encoded result of a corresponding picture which is one before each picture and the average quantizing scale Q, as shown in the above equations (8) to (10).

Also, as the second assumption, it is assumed that, when, with the quantizing scale Qi of the I picture independently encoded being used as a reference, the ratio Kp between the quantizing scale Qi of the I picture and the quantizing scale Qp of the P picture becomes 1.0 (Kp=1.0) and the ratio Kb between the quantizing scale Qi of the I picture and the quantizing scale Qb of the B picture becomes 1.4 (Kb=1.4), the quality of image as a whole be optimized at all times (an ideal quality of image be achieved).

Under the above-described first and second assumptions, in the fourth embodiment, there are determined the target amount of codes Ti for the I picture, the target amount of codes Tp for the P picture, and the target amount of codes Tb for the B picture, respectively, in accordance with, for example, the following equations (11) to (13).

$$Ti = \text{MAX}\left[\frac{R}{1 + \frac{NpXp}{XiKp} + \frac{NbXb}{XiKb}}, \frac{BitRate}{8 \times PictureRate}\right] \quad (11)$$

$$Tp = \text{MAX}\left[\frac{R}{Np + \frac{NbKpXb}{KbKp}}, \frac{BitRate}{8 \times PictureRate}\right] \quad (12)$$

$$Tb = \text{MAX}\left[\frac{R}{Nb + \frac{NpKbXp}{KpKb}}, \frac{BitRate}{8 \times PictureRate}\right] \quad (13)$$

Provided, however, that the Np and the Nb in these equations (11) to (13) represent the number of the non-encoded pieces of picture of the P picture or the B picture within the GOP.

Namely, first, of the non-encoded pictures within the GOP, regarding the picture whose picture type is different from that of the picture becoming an object to be encoded, it is estimated, under the image quality optimizing conditions, how many times the amount of codes generated with regard to that picture becomes as large as the generated amount of codes generated with regard to the picture constituting an object to be encoded.

Next, it is determined how many pieces of the picture constituting an object to be encoded the estimated amount of codes generated with regard to the non-encoded pictures as a whole corresponds to. The target amount of codes with regard to the picture constituting an object to be encoded is given by dividing the target amount of codes R with regard to the non-encoded pictures by the number of those pieces that have been thus obtained. Based on the target amount of codes that has been determined in this way, each time the picture type is encoded, there is renewed the target amount of codes R with regard to the non-encoded pictures within the GOP in accordance with the following equations (14), (15), or (16).

$$R = R - Si \quad (14)$$

$$R = R - Sp \quad (15)$$

$$R = R - Sb \quad (16)$$

Further, according to this fourth embodiment, in the target amount-of-code/generated amount-of-code comparing unit 35, comparison is performed between the target amounts of codes Ti, Tp, and Tb with regard to the respective pictures, that have been determined in the above-described first step, and the actual generated amounts of codes that have been supplied from the buffer memory 6 via the terminal 33 of FIG. 5. Production is thereby performed of an error amount of codes that is the difference between each picture target amount of codes and its corresponding generated amount of codes. This error amount-of-code message is sent to the feedback quantizing-value determining unit 34.

Next, according to the amount-of-code controlling unit 24 of the fourth embodiment, as a second step, in the feedback quantizing value determining unit 34, in order to coincide the actual generated amounts of codes with the target amounts of codes Ti, Tp, and Tb with regard to the respective pictures respectively, the quantizing scales are determined through the feedback control made in macroblock units on the basis of the capacities of the 3 kinds of virtual buffers that have each been independently set every picture type.

Namely, first, before encoding of the j-th macroblock data, the amount of occupation of the virtual buffer is determined in accordance with the following equations (17) to (19).

$$d_j^i = d0^i + B_{j-1} - \frac{Ti(j-1)}{MB\_cnt} \quad (17)$$

$$d_j^p = d0^p + B_{j-1} - \frac{Tp(j-1)}{MB\_cnt} \quad (18)$$

$$d_j^b = d0^b + B_{j-1} - \frac{Tb(j-1)}{MB\_cnt} \quad (19)$$

In these equations, the $d0^i$, the $d0^p$, and the $d0^b$ represent the initial amounts of occupation of the virtual buffer that respectively correspond to the picture types; the $B_j$ represents the generated amount of bits that covers the data from a foremost to the j-th macroblock of the picture; and the MB_cnt represents the number of the macroblocks within the I picture.

Next, the quantizing scale Qj on the j-th macroblock is calculated in accordance with the following equation (20).

$$Q_j = d_j \times 31 / r \quad (20)$$

It is to be noted that in the equation the r represents the parameter for determining the response speed at which feedback is made, and that the r is given by the following equation (21).

$$r = 2 \times \text{bit\_rate}/\text{picture\_rate} \tag{21}$$

The above-described algorithm is described in the test model TM 5 that has been used in the MPEG standardization, and is also reported in the Learned Society Report Collection on TV 1995, vol. 149, No. 4, p 455 to 456.

As a result of this, the amount of codes that regards each picture is controlled to the target amount of codes that has been thus determined.

Turning back to FIG. 10, the target amount of codes message on the video object unit, which has been calculated in the unit target amount-of-code calculating unit 23 is transmitted to the unit address calculating unit 15.

As were stated above in connection with FIG. 6, in this unit address calculating unit 15, the addresses TEA of a prescribed number of video object units that, with this video object unit being deemed as a reference, are reproduced at least before and after this reference video object unit in order to make a search are calculated, using the unit target amount of codes messages and the encoding rate messages transmitted from the audio/video amount-of-code determining unit 13, i.e. Video Rate (kbps) and Audio Rate AR (kbps), as in accordance with the above-described equation (4).

Also, in this fourth embodiment, as in the case of the above-described first embodiment, it is assumed that the audio data be transferred at a fixed transfer rate; and the number of samples per unit length of time be fixed. However, if audio data is encoded in the form of being variable length encoded, it is sufficient to calculate with the amount of codes, which regards the audio data at the position corresponding to the video data (corresponding to a time at which the video data is output), taken into consideration. Incidentally, calculating like this can be realized by equipping the apparatus with the unit target amount-of-code calculating unit 23 or the target amount-of-code memory according to the above-described second embodiment for the purpose of an audio version.

Next, in this fourth embodiment, the coded data from the buffer memory 6 is also transmitted to the unit memory 25 and is stored therein. From the data of the video object unit that has been-stored in the unit memory 25 there are detected by the unit address detecting unit 26 the address 1 VEA of the first reference within the video object unit, the address 2 VEA of the second reference within the same, and the address 3 VEA of the third reference within the same. And the values of these addresses are sent to the unit address-calculating unit 15.

Here, in the MPEG, at the foremost position of the picture there is depicted the 4-byte code "Picture_start_code (0×00000100)" that can be uniquely discriminated. As a result of this, the respective bytes numbers of the 2nd, 5th, and 8th pictures of the video object unit, that are counted from the foremost position thereof, correspond to the addresses 1 VEA, 2 VEA, and 3 VEA, respectively.

Accordingly, in the unit address calculating unit 15, as illustrated in the previous FIG. 6, for making a search, the address 1EA, the address 2EA, and the address 3EA, for example, are calculated in accordance with the following equations (22) to (24) by the use of the target amount of codes message, each of which has been calculated in the unit target amount of codes calculating unit 23 every video object unit, and the encoding rate message that is sent from the audio/video encoding rate determining unit 13, i.e. in the case of the fourth embodiment, the Audio Rate(kbps). Here, it is to be noted that the address 1EA represents an ending address of the data capable of constituting the I picture within the video object unit. Also, the address 2EA represents an ending address of the data capable of constituting the initial P picture within the video object unit. Further, the address 3EA represents an ending address of the data capable of constituting the next P picture within the video object unit.

$$1EA = 1VEA + \text{Audio Rate} \times 1/29.97 \tag{22}$$

$$2EA = 2VEA + \text{Audio Rate} \times 4/29.97 \tag{23}$$

$$3EA = 3VEA + \text{Audio Rate} \times 7/29.97 \tag{24}$$

Provided, however, that, in these equations (22) to (24), the unit of measure is k bit, and it is assumedly made known that the 1 video object unit corresponds to 1 GOP; the 1 GOP is 15 frames; and the B picture existing between the I picture and the P picture is 2 pieces. Also, although it is assumed that the audio data be transferred at a fixed transfer rate and under this assumption the number of samples per unit length of time be fixed, if encoding of the audio data is performed in the form of variable length encoding, relevant calculation has only to be performed considering the amount of codes of the audio data that exists at a position corresponding to the video data (i.e. that corresponds to a time at which the video data is output). Such a relevant calculation is possible by equipping the apparatus with the unit target amount-of-code calculating unit 23 or the above-described target amount-of-code memory of the second embodiment for the purpose of using it for audio data.

In the unit address calculating unit 15 of this fourth embodiment, using the address messages that have been detected by the above-described unit address detecting unit 26, it is possible to calculate the amount of codes up to a position until which calculation is necessary and accordingly to calculate the addresses of the video object units. Thereafter, these calculated messages are sent to the navigation data-producing unit 16. The navigation data-producing unit 16 determines this video object unit as being the 0th unit as viewed in the sequential order of reproduction. And, using this video object unit as a reference unit, the video object units that are reproduced up to at least the 15th unit as forwardly and backwardly viewed therefrom in the sequential order of reproduction, the 20th, the 30th, the 60th, 120th, and the 240th video object unit as viewed in the sequential order of reproduction, etc. have their addresses calculated by making the address scalar-fold if necessary, whereby the unit 16 lays them out in a prescribed sequential order of reproduction and sends them to the unifying unit 17.

The unifying unit 17, as in the case of the above-described respective embodiments, produces such video object units as were explained in connection with FIG. 3, by using the audio encoded data supplied from the terminal 19, the video encoded data output from the buffer memory 6 and passed through the unit memory 25 and the unit address detecting unit 26, and the navigation data supplied from the navigation data producing unit 16, and outputs the encoded data that has been unified therein.

As has been described above, in the audio/video encoding apparatus according to the fourth embodiment of the present invention, it becomes possible to record, before the encoding is started, the navigation data that represents the reproduction control message for reproducing the video object unit and the search message for making a search, without having a memory that would be unnecessary.

Figure 11:
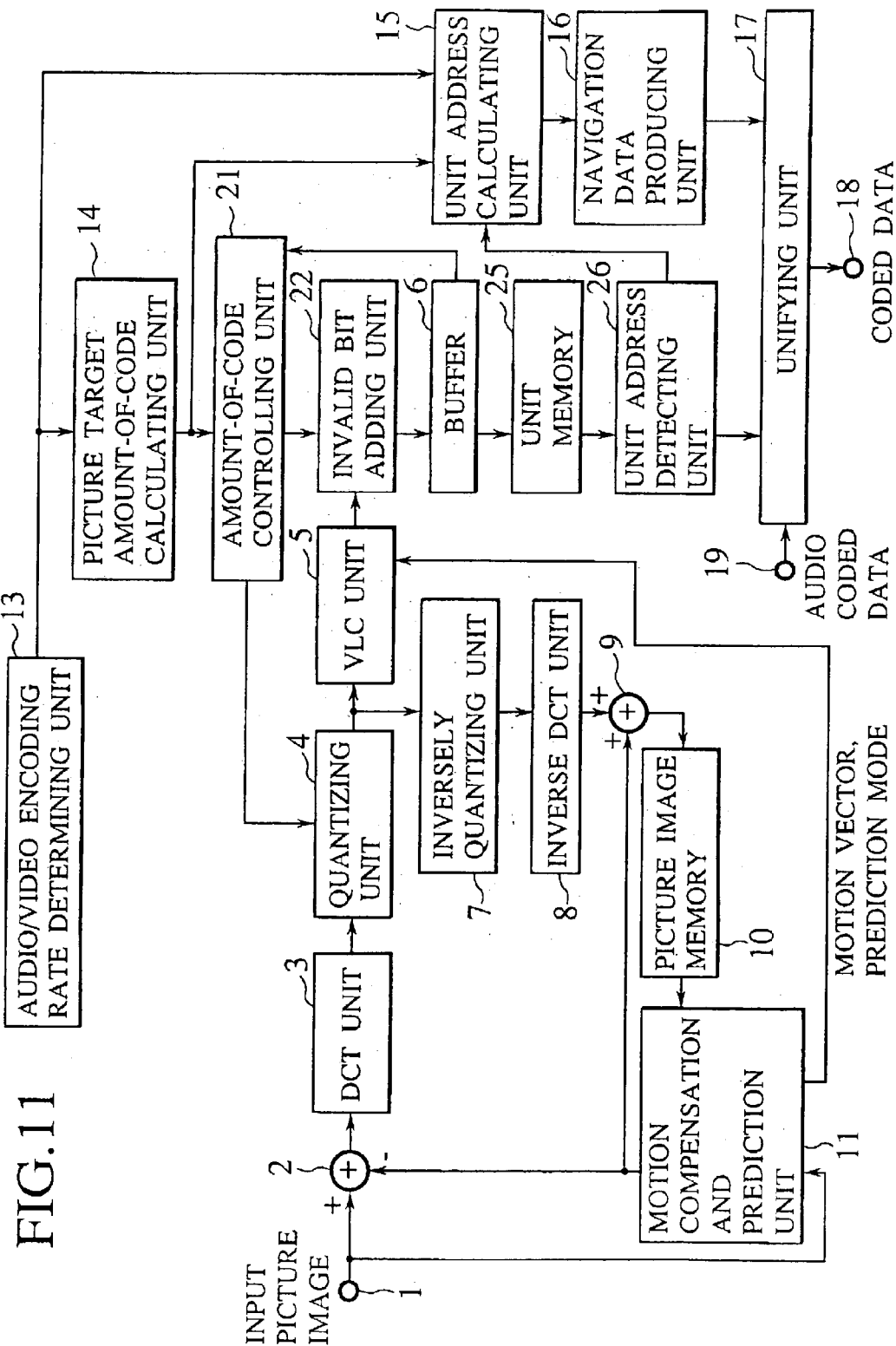
FIG. 11 is a block diagram illustrating a schematic construction of an audio/video encoding apparatus according to a fifth embodiment of the present invention.

Next, FIG. 11 illustrates a schematic construction of the audio/video encoding apparatus according to a fifth embodiment of the present invention. It is to be noted that, in this fifth embodiment illustrated in FIG. 11, as in the case of the above-described third embodiment, an invalid bit adding unit 22 is provided between the VLC unit 5 and the buffer memory 6, and, as in the case of the above-described fourth embodiment, a unit memory 25 and a unit address detecting unit 26 are provided between the buffer memory 6 and the unifying unit 17, by way of example. In the example of FIG. 11, the same constituent elements as those in FIGS. 8 and 10 are denoted by like indication symbols and an explanation thereof is omitted by making only an explanation of the constituent elements different from those in FIGS. 8 and 10.

Namely, according to the audio/video encoding apparatus of this fifth embodiment, the amount-of-code controlling unit 21 has the above-described construction such as that illustrated in FIG. 9. Namely, the temporary picture target amount of codes is set from the picture target amount of codes, and this temporary picture target amount of codes is compared with the generated amount of codes from the buffer memory. And, the quantizing value is controlled according to the compared result and, on the other hand, invalid bits are calculated. Also, in the invalid bit adding unit 22, to the encoded data from the VLC unit 5 are added the invalid bits that correspond to the amount-of-invalid-bit-code message from the amount-of-code controlling unit 21. As a result of this, from the invalid bit-adding unit 22 is output encoded data that accurately is in coincidence with the picture target amount of codes.

Also, in the audio/video encoding apparatus according to this fifth embodiment, the coded data output from the buffer memory 6 is stored in the unit memory 25. From the data of this unit memory 25 there are detected by the unit address detecting unit 26 the addresses 1 VEA, 2 VEA, and 3 VEA of the first, the second, and the third reference. Further, in the unit address-calculating unit 15, the address of the video object unit is calculated.

According to the audio/video encoding apparatus of this fifth embodiment, it not only becomes possible to record, before the encoding is started, the navigation data that represents the reproduction control message for reproducing the video object unit and the search message for making a search, without having a memory that would be unnecessary, as in the case of the above-described fourth embodiment, but, as in the case of the above-described third embodiment, it is possible to control the amount of codes very accurately. As a result of this, it is also possible to make very low the possibility that the contents of the navigation data and the actual encoded data will be inconsistent with each other.

Figure 12:
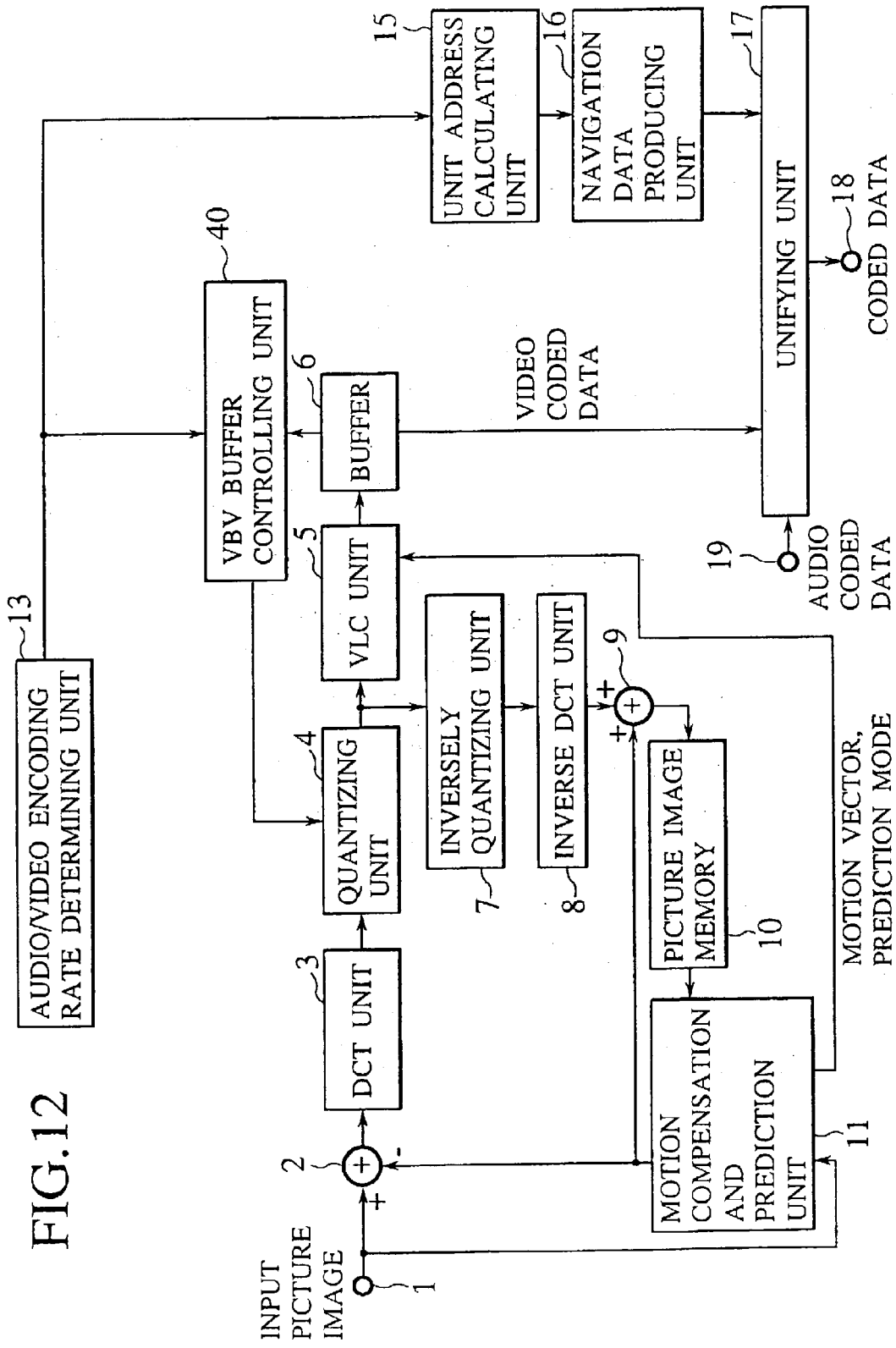
FIG. 12 is a block diagram illustrating a schematic construction of an audio/video encoding apparatus according to a sixth embodiment of the present invention.

Next, FIG. 12 illustrates a schematic construction of the audio/video encoding apparatus according to a sixth embodiment of the present invention. It is to be noted that, in the audio/video encoding apparatus illustrated in FIG. 12, the same constituent elements as those in FIG. 4 are denoted by like indication symbols and an explanation thereof is omitted with only the constituent elements different from those in FIG. 4 being explained.

In this sixth embodiment, the encoding rate message that has been determined by the audio/video encoding rate determining unit 13 is sent to the VBV buffer controlling unit 40 and the unit address calculating unit 15.

Figure 13:
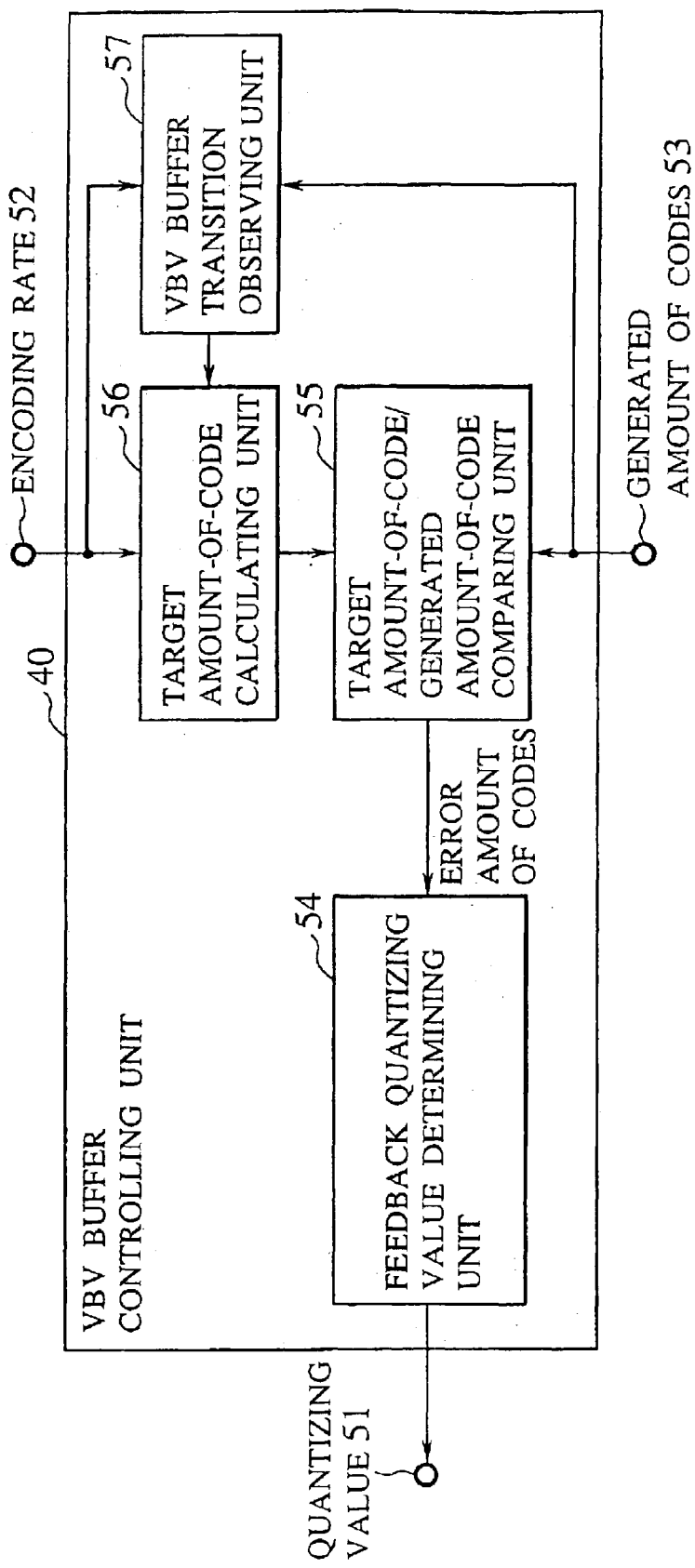
FIG. 13 is a block diagram illustrating a schematic construction of a VBV buffer controlling unit of an audio/video encoding apparatus according to the sixth embodiment of the present invention.

Here, the processing that is performed in the VBV buffer controlling unit 40 of the audio/video encoding apparatus of the sixth embodiment will hereafter be explained using FIG. 13.

In this FIG. 13, to the terminal 53 of the VBV buffer controlling unit 40 is input the generated amount of codes message that is obtained in macroblock units from the buffer memory 6. Also, to the terminal 52 is input the encoding rate message that has been determined by the audio/video encoding rate determining unit 13. And, from the terminal 51, there is output the amount-of-code control signal (the signal for controlling the quantizing scale, i.e. the quantizing value) that is directed toward the quantizing unit 4.

The encoding rate message that has been input to the terminal 52 is sent to the target amount-of-code calculating unit 56 and a VBV buffer transition observing unit 57. The target amount-of-code calculating unit 56 calculates the amount of codes (target amount of codes), which becomes a target, in units of a picture according to the encoding rate message.

An explanation will now be given of the operational flow of the VBV buffer control unit 40 that includes the operation from the calculation of the target amount of codes in units of a picture to the control of the generated amount of codes.

Assuming, for example, that T(U) represents the target amount of codes of the video object unit, 1 video object unit have 1 GOP; and 1 GOP have 15 frames. Since this 1 video object unit corresponds to 0.5 second when viewed from the aspect of time, the calculation equation of the unit target amount of codes T(U) that regards the video object unit (the 15 pieces of picture that is contained in the 1 GOP) is as expressed by, for example, the following equation (25). Provided, however, that the N in the equation represents the transfer rate(Mbps).

$$T(U)=N/2(M \text{ bits}) \quad (25)$$

In the unit target amount-of-code calculating unit 56, in accordance with the calculation performed using the equation (25), there is determined the target amount of codes in units of a video object unit.

Next, in the amount-of-code controlling unit 56, as a first step, setting (distribution of the amount of codes) of the target amount of codes with respect to each picture is performed, as explained below, according to the target amount of codes with regard to the video object unit that has been determined in the above-described way.

Concretely explaining, in the amount-of-code controlling unit 56 of the VBV buffer control unit 40, as this first step, on the basis of the target amount of codes R with respect to the pictures that have not been encoded yet within the GOP and that include the pictures each as an object to be encoded, distribution is performed of the target amount of codes with respect to each picture within the GOP. This distribution is repeatedly performed in the sequential order of the pictures each as an object to be encoded within the GOP. At this time, the target amount of codes with respect to each picture is set by the use of the two assumptions that follow.

As the first assumption, it is assumed that the product of the average quantizing scale, that is used when each picture is encoded and the generated amount of codes become a constant value every picture type so long as no change occurs in the image screen. After having encoded each picture, prescribed weighting parameters (for example, the weighting parameters indicating the complexity of the image screen) Xi, Xp, and Xb that are each used every picture type are renewed in accordance with the following equations (26) to (28).

$$Xi=Si \times Qi \quad (26)$$

$$Xp=Sp \times Qp \quad (27)$$

$$Xb=Sb \times Qb \quad (28)$$

It is to be noted here that in these equations the i represents the I picture; the p represents the P picture; and the b represents the B picture. Also, in these equations, the Si, the Sp, and the Sb each represent the generated amount of codes that corresponds to the encoded result of a corresponding picture which is one before each picture. The Qi, the Qp, and the Qb each represent the average quantizing scale that is used when each picture is encoded. Namely, the weighting parameters Xi, Xp, and Xb are each defined, from these equations (26) to (28), as being the product of the generated amount of codes S that corresponds to the encoded result of a corresponding picture which is one before each picture and the average quantizing scale Q.

Also, as the second assumption, it is assumed that, when, with the quantizing scale Qi of the I picture independently encoded being used as a reference, the ratio Kp between the quantizing scale Qi of the I picture and the quantizing scale Qp of the P picture becomes 1. 0 (Kp=1. 0) and the ratio Kb between the quantizing scale Qi of the I picture and the quantizing scale Qb of the B picture becomes 1. 4 (Kb=1.4), the quality of image as a whole be optimized at all times (an ideal quality of image be achieved).

Under the above-described first and second assumptions, in the target amount-of-code calculating unit 56, there are determined the target amount of codes Ti for the I picture, the target amount of codes Tp for the P picture, and the target amount of codes. Tb for the B picture, respectively, in accordance with, for example, the following equations (29) to (31).

$$Ti = \text{MAX}\left[\frac{R}{1 + \frac{NpXp}{XiKp} + \frac{NbXb}{XiKb}}, \frac{BitRate}{8 \times PictureRate}\right] \quad (29)$$

$$Tp = \text{MAX}\left[\frac{R}{Np + \frac{NbKpXb}{KbKp}}, \frac{BitRate}{8 \times PictureRate}\right] \quad (30)$$

$$Tb = \text{MAX}\left[\frac{R}{Nb + \frac{NpKbXp}{KpKb}}, \frac{BitRate}{8 \times PictureRate}\right] \quad (31)$$

Provided, however, that the Np and the Nb in these equations (29) to (31) represent the number of the non-encoded pieces of picture of the P picture or the B picture within the GOP.

Namely, first, of the non-encoded pictures within the GOP, regarding the picture whose picture type is different from that of the picture becoming an object to be encoded, it is estimated, under the above-described image quality optimizing conditions, how many times the amount of codes generated with regard to that picture becomes as large as the generated amount of codes that is generated with regard to the picture constituting an object to be encoded.

Next, it is determined how many pieces of the picture constituting an object to be encoded the estimated amount of codes generated with regard to the non-encoded pictures as a whole corresponds to. The target amount of codes with regard to the picture constituting an object to be encoded is given by dividing the target amount of codes R with regard to the non-encoded pictures by the number of those pieces that have been thus obtained. Based on the target amount of codes that has been determined in this way, each time each picture type is encoded, there is renewed the target amount of codes R with regard to the non-encoded pictures within the GOP in accordance with the following equations (32), (33), or (34).

$$R=R-Si \quad (32)$$

$$R=R-Sp \quad (33)$$

$$R=R-Sb \quad (34)$$

Next, according to the VBV buffer control unit 40, in the target amount-of-code/generated amount-of-code comparing unit 35, comparison is performed between the target amounts of codes Ti, Tp, and Tb with regard to the respective pictures, that have been determined in the first step, and the actual generated amounts of codes that have been supplied from the buffer memory 6 via the terminal 33 of FIG. 13. Production is thereby performed of an error amount of codes that is the difference between each picture target amount of codes and its corresponding generated amount of codes. This error amount-of-code message is sent to the feedback quantizing-value-determining unit 54.

As a second step, in the feedback quantizing value-determining unit 34, in order to coincide the actual generated amounts of codes with the target amounts of codes Ti, Tp, and Tb with regard to their corresponding pictures respectively, the quantizing scales are determined through the feedback control made in macroblock units on the basis of the capacities of the 3 kinds of virtual buffers that have each been independently set every picture type.

Namely, first, before encoding of the j-th macroblock data, the amount of occupation of the virtual buffer is determined in accordance with the following equations (35) to (37).

$$d_j^i = d0^i + B_{j-1} - \frac{Ti(j-1)}{\text{MB\_cnt}} \quad (35)$$

$$d_j^p = d0^p + B_{j-1} - \frac{Tp(j-1)}{\text{MB\_cnt}} \quad (36)$$

$$d_j^b = d0^b + B_{j-1} - \frac{Tb(j-1)}{\text{MB\_cnt}} \quad (37)$$

In these equations, the $d0^i$, the $d0^p$, and the $d0^b$ represent the initial amounts of occupation of the virtual buffer that respectively correspond to the respective picture types; the $B_{j-1}$ represents the generated amount of bits that covers from a foremost to the j-th macroblock of the picture; and the MB_cnt represents the number of the macroblocks within the I picture.

Next, the quantizing scale Qj on the j-th macroblock is calculated in accordance with the following equation (38).

$$Q_j = d_j \times 31/r \quad (38)$$

It is to be noted that in the equation the r represents the parameter for determining the response speed at which feedback is made, and that the r is given by the following equation (39).

$$r = 2 \times \text{bit\_rate/picture\_rate} \quad (39)$$

The above-described algorithm is described in the test model TM 5 that has been used in the MPEG standardization, and this algorithm is also reported in the Learned Society Report Collection on TV 1995, vol. 149, No. 4, p 455 to 456.

Here, in the case of the audio/video encoding apparatus according to the sixth embodiment of the present invention, in the VBV buffer control unit 40, at the point in time when the target amount-of-code calculating unit 56 has calculated as the first step the target amount of codes that regards each picture as stated above, it is arranged that the VBV buffer transition observing unit 57 previously anticipates the amount of occupation of the VBV buffer under the assumption of its encoding each picture with this target amount of codes to thereby correct the target amount of codes according to the thus-anticipated value. Namely, the VBV buffer transition observing unit 57 monitors the amount of occupation of the VBV buffer according to the generated amount of codes that is supplied from the buffer memory 6 via the terminal 53 and the encoding rate that is supplied from the audio/video encoding rate determining unit 13 via the terminal 52. It is thereby arranged that, according to this amount of occupation of the VBV buffer, the unit 57 correct the target amount of codes that was set in the first step by the target amount-of-code calculating unit 56.

Figure 14:
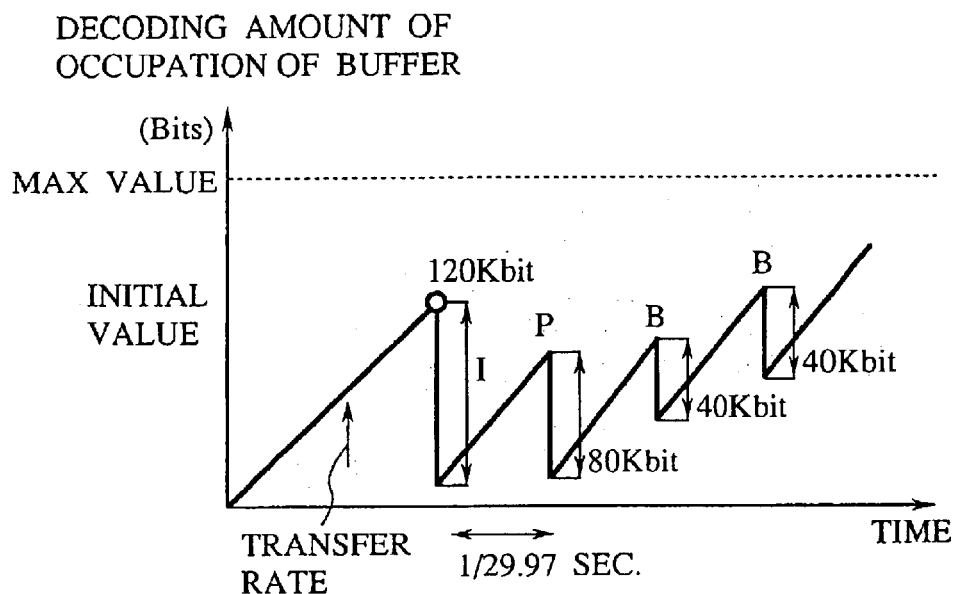
FIG. 14 is a view that is used for illustration of the control that is performed of the amount of occupation of a general virtual decoding buffer (VBV buffer) when encoding is performed.

By the way, a general VBV buffer control unit as defined in the MPEG originally controls the amount of codes while anticipating, under the assumption that decoding have been performed in a decoding apparatus, how the amount of occupation of the decoding buffer (the VBV buffer in case of the encoding apparatus) is making its transition as illustrated in FIG. 14. The buffer that is used for the anticipation is still a virtual buffer. However, in the MPEG, in the case of CBR (constant bit rate), encoding must be performed while controlling the amount of codes so that the same does not overflow a maximum capacity (MaxValue), and so that the same does not underflow a minimum capacity (0). It is to be noted the ordinate axis of FIG. 14 represents the amount of occupation of the decoding buffer (i.e., the VBV buffer) of the virtual decoding apparatus while the abscissa axis represents time. Also, the inclination that indicates the change in the amount of occupation of the buffer corresponds to the transfer rate, i.e. the encoding rate.

In this FIG. 14, by way of example, illustration is made of a case where encoding has been done of a video signal that corresponds to the NTSC (National Television System Committee) method that is concerned with a standard television broadcasting system. Accordingly, it results that the timing with which each picture is decoded occurs in units of 1/29.97 sec. Namely, in the decoding buffer (VBV buffer), the 120-Kbit compressed data that constitutes the I picture, which is the first picture of the video object unit, is written as initial values. Thereafter, the data that corresponds to this amount of 120 K bits is readout and decoded. However, since the decoding performed in this VBV buffer is virtual decoding and, in the model defined in the MPEG, the relevant data is instantaneously decoded at a length of time "0", from the VBV buffer (decoding buffer) at this point in time is instantaneously drawn out the data corresponding to 120 K bits. Next, during, and after the passage of, a time period of 1/29.97 sec. thereafter, the 80-Kbit compressed data that constitutes the P picture, which is the second picture, is input to the decoding buffer (VBV buffer). Thereafter, for decoding this P picture, the compressed data corresponding to this amount of 80 K bits is instantaneously drawn out. Next, during, and after the passage of, a time period of 1/29.97 sec. thereafter, the 40-Kbit compressed data that constitutes the B picture, which is the third picture, is input to the decoding buffer (VBV buffer). Thereafter, for decoding this B picture, the compressed data corresponding to this amount of 40 K bits is instantaneously drawn out. Thereafter, regarding each of the respective pictures, the same processing of inputting data and drawing it out is performed.

In this way, the general control of VBV buffer in the MPEG depends on the transfer rate of the compressed data input to the decoding buffer (VBV buffer), i.e. the encoding rate corresponding to the straight-line inclination of the graph shown in FIG. 14.

Figure 15:
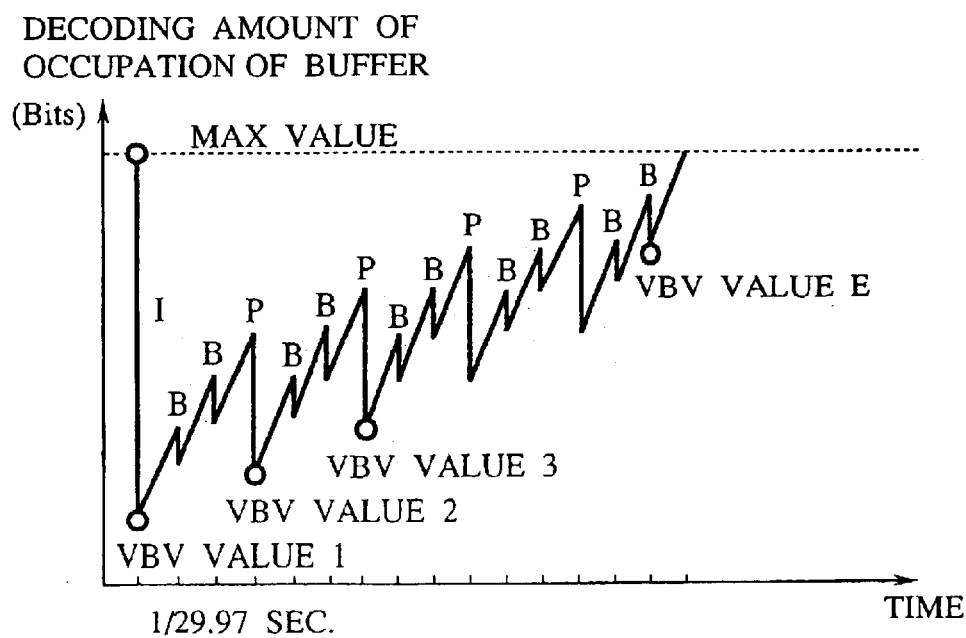
FIG. 15 is a view that is used for illustration of the buffer control timing and the convergence value for controlling the amount of occupation of a virtual decoding buffer (VBV buffer) when encoding is performed with the use of an audio/video encoding apparatus according to the embodiments of the present invention.

In contrast to this, in the audio/video encoding apparatus according to the sixth embodiment of the present invention, the VBV buffer transition observing unit 57 of the VBV buffer control unit 40 monitors the amount of VBV buffer according to the generated amount of codes supplied from the buffer memory 6 via the terminal 53 and the encoding rate supplied from the audio/video encoding rate determining unit 13 via the terminal 52. The VBV buffer transition observing unit 57 thereby corrects the target amount of codes set in the first step by the target amount-of-code calculating unit 56, as follows. Namely, as illustrated in FIG. 15 that is depicted similarly to FIG. 14, the unit 57 operates to make the value of occupation of the VBV buffer converge into an illustrated VBV value 1 at the point in time when encoding is performed of a first reference picture image that initially within the video object unit becomes an object, to which reference is made for decoding another picture image (i.e. the point in time for encoding the I picture that is picture image data that is independently encoded). Next, the unit 57 operates to make the value of occupation of the VBV buffer converge into an illustrated VBV value 2 at the point in time when decoding is performed of a second reference picture image that becomes an object, to which reference is made for decoding another picture image (i.e. the point in time for encoding the initial P picture). Further, next, the unit 57 operates to make the value of occupation of the VBV buffer converge into an illustrated VBV value 3 at the point in time when decoding is performed of a third reference picture image that becomes an object, to which reference is made for decoding another picture image (i.e. the point in time for encoding the next P picture). After having repeated these pieces of processing in this way, the unit 57 makes its said correction operation by operating to make the value of occupation of the VBV buffer converge into an illustrated VBV value E at the point in time when decoding is performed of a final reference picture image within the video object unit (i.e. the point in time for encoding the final B picture).

By correcting the respective target amounts of codes with regard to the I picture that is independently encoded, the P picture that when decoding is performed becomes a reference picture image for another picture image, and the B picture that is a final picture within the video object unit through the operation of the VBV buffer control unit 40 in the above-described way, it becomes very easy to calculate the respective addresses of a reference unit for making a search and a prescribed number of video object units that are reproduced at least before and after this reference unit, as well as the respective ending addresses of, among the data items within the unit, the I picture that is independently encoded, the P picture that when decoding is performed is used as reference data for another item of data, and the final B picture within the video object unit. As a result of this, it becomes possible to make a simple control of these addresses to previously designated address values.

Turning back to FIG. 12, in the unit address calculating unit 15, using the VBV values 1 to E similar to those previously explained in connection with FIG. 15 and the transfer rate message (encoding rate message), calculation is performed of the following ending addresses in accordance with the respective equations that will be explained below. Namely, calculation is performed of the ending address 1EA of the first reference picture image (the I picture that is the picture image data that is independently encoded), which initially within the video object unit becomes an object to be referred to for decoding another picture image as illustrated in FIG. 6, of the ending address 2EA of the second reference picture image (the initial P picture), which becomes an object to be referred to for decoding another picture image, and of the ending address 3EA of the third reference picture image (the next P picture), which next becomes an object to be referred to for decoding another picture image. Thereafter, similarly, calculation is performed of the ending addresses of the respective reference picture images, and of the ending address TEA of the final picture image (the final B picture) within the video object unit.

Here, assuming that, of the encoding rate messages from the audio/video encoding rate determining unit 13, Video Rate(kbps) represent the encoding rate of the video data; and Audio Rate(kbps) represent the encoding rate of the audio data, the ending address TEA of the final picture image (B picture) of the video object unit is calculated in accordance with the following equation (40).

$$TEA = (\text{Video Rate} + \text{Audio Rate}) \times 15/29.97 \quad (40)$$

Also, assuming that Max Value represents the maximum capacity that has been preset in the VBV buffer, and that, as were illustrated in FIG. 6, 1EA represents the ending address of the I picture within the video object unit; 2EA represents the ending address of the initial P picture within the video object unit; and 3EA represents the ending address of the next P picture within the video object unit, these ending addresses 1EA to 3EA are calculated in accordance with the following equations (41) to (43).

$$1EA = (\text{Max Value} - VBV \text{ value 1}) + (\text{Audio Rate}) \times 1/29.97 \quad (41)$$

$$2EA = (\text{Max Value} - VBV \text{ value 1}) + (\text{Video Rate}) \times 3/29.97 - (VBV \text{ value 2} - VBV \text{ value 1}) + (\text{Audio Rate}) \times 4/29.97 \quad (42)$$

$$3EA = (\text{Max Value} - VBV \text{ value 1}) + (\text{Video Rate}) \times 6/29.97 - (VBV \text{ value 3} - VBV \text{ value 1}) + (\text{Audio Rate}) \times 7/29.97 \quad (43)$$

Provided, however, that, in these equations (41) to (43), the unit of measure is k bit, and it is assumedly made known that the I video object unit correspond to 1 GOP; the 1 GOP be 15 frames; and the B picture existing between the I picture and the P picture be 2 pieces. Also, although it is assumed that the audio data be transferred at a fixed transfer rate and under this assumption the number of samples per unit length of time be fixed, if encoding of the audio data is performed in the form of variable length encoding, relevant calculation has only to be performed considering the amount of codes of the audio data that exists at a position corresponding to the video data (, i.e. that corresponds to a time at which the video data is output). Such a relevant calculation is possible by equipping the apparatus with the unit target amount-of-code calculating unit 56 or the target amount-of-code memory as later described for the purpose of using it for audio data.

As has been described above, according to the audio/video encoding apparatus of this embodiment, in the VBV buffer control unit 40, correction is performed of the target amounts of codes that regard the I picture to be independently encoded, the P picture that when decoding is performed becomes a reference picture image for another picture image, and the final B picture within the video object unit, respectively. Simultaneously, in the control unit 40, control is performed of the generated amounts of codes so that the same may be in conformity with these target amounts of codes. Also, in the unit address calculating unit 15, calculation is performed of the address of a reference unit for making a search and the addresses of a prescribed number of units that are reproduced at least before and after this reference unit, as well as the respective ending addresses of, among the data items within this unit, the I picture that is independently encoded, the P picture that when decoding is performed is used as reference data for another piece of data, and the final B picture within the video object unit. By performing this calculation, it becomes possible to make a simple control to previously designated values, of the navigation data for recording search messages used for reproduction of the video object unit such as that illustrated in FIG. 3, i.e. the addresses (TEA) of a prescribed number of units that, with this video object unit being used as a reference, are reproduced at least before and after this reference unit for the performance of a search, the ending address (the ending address 1EA of the first reference picture image) of the data capable of constructing the independently encoded picture image (I picture), and the respective ending addresses (2EA, 3EA, . . . ) of the second, the third, . . . , and the final reference picture image.

The messages that have been determined in this unit address-calculating unit 15 are sent to the navigation data producing unit 16.

The navigation data-producing unit 16 determines this video object unit as being the 0th unit as viewed in the sequential order of reproduction. And, using this video object unit as a reference unit, the unit 16 calculates the addresses of the video object units that are reproduced up to at least the 15th unit as forwardly and backwardly viewed therefrom in the sequential order of reproduction, the addresses of the 20th, the 30th, the 60th, 120th, and the 240th video object unit as viewed in the sequential order of reproduction, etc. by making the address scalar-fold if necessary. Then, the unit 16 lays them out in a prescribed sequential order of reproduction and sends them to the unifying unit 17.

The unifying unit 17 produces such video object units as were explained in connection with FIG. 3, by using the audio encoded data supplied from the terminal 19, the video encoded data output from the buffer memory 6, and the navigation data supplied from the navigation data-producing unit 16, and outputs the encoded data that has been unified therein. Namely, the unifying unit 17 packets (packs) the navigation data that has been transmitted thereto, packets (packs) the video encoded data, audio encoded data, etc., further disposes the packet of the navigation data (the navigation pack) at the foremost position, thereafter disposes the packet of the video data (the video pack), the packet of the audio data (the audio pack), etc., thereby produces a prescribed one video object unit, and sends this one video object unit. When the unifying unit 17 has finished the transmission of the one video object unit, the unifying unit 17 receives navigation data for use in the production of a next unit and similarly unifies it. The encoded data that has been thus unified is output from the output terminal 18.

As has been described above, in the audio/video encoding apparatus according to the sixth embodiment of the present invention, it becomes possible to record, before the encoding is started, the navigation data that represents the reproduction control message for reproducing the video object unit and the search message for making a search, without having a memory that would be unnecessary.

Figure 16:
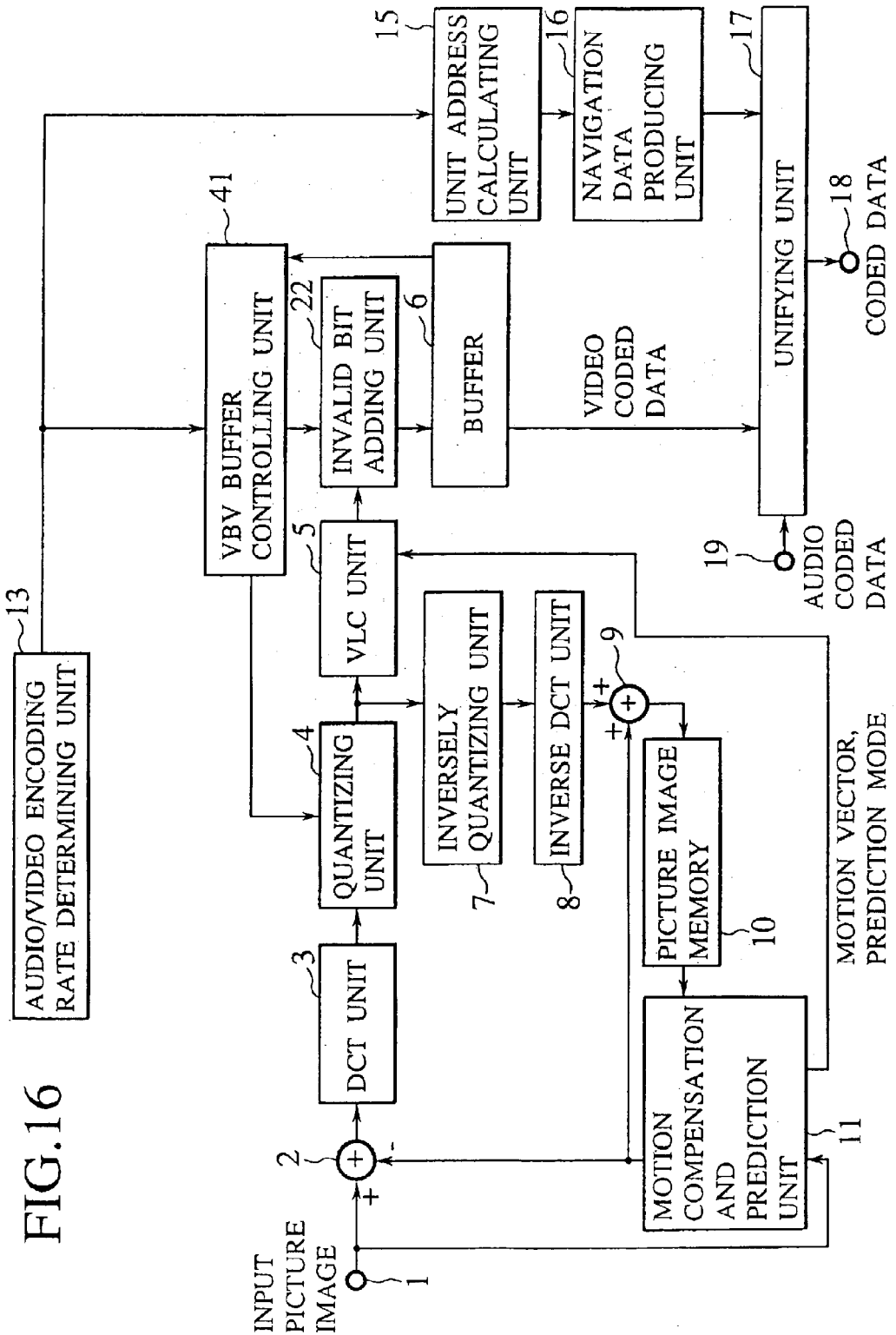
FIG. 16 is a block diagram illustrating a schematic construction of an audio/video encoding apparatus according to a seventh embodiment of the present invention.

Next, FIG. 16 illustrates a schematic construction of the audio/video encoding apparatus according to a seventh embodiment of the present invention. It is to be noted that, in this audio/video encoding apparatus illustrated in FIG. 16, the same constituent elements as those in FIG. 12 are denoted by like indication symbols and an explanation thereof is omitted by making only an explanation of the constituent elements different from those in FIG. 12.

In the audio/video encoding apparatus of the seventh embodiment illustrated in FIG. 16, an invalid bit adding unit 22 as later described is provided between the VLC unit 5 and the buffer memory 6, and the VBV buffer control unit 41 has a construction such as that illustrated in FIG. 17. It is to be noted that, in FIG. 17, the same constituent elements as those stated in connection with FIG. 13 are denoted by like indication symbols and an explanation thereof is omitted by making only an explanation of the constituent elements different from those in FIG. 13.

Figure 17:
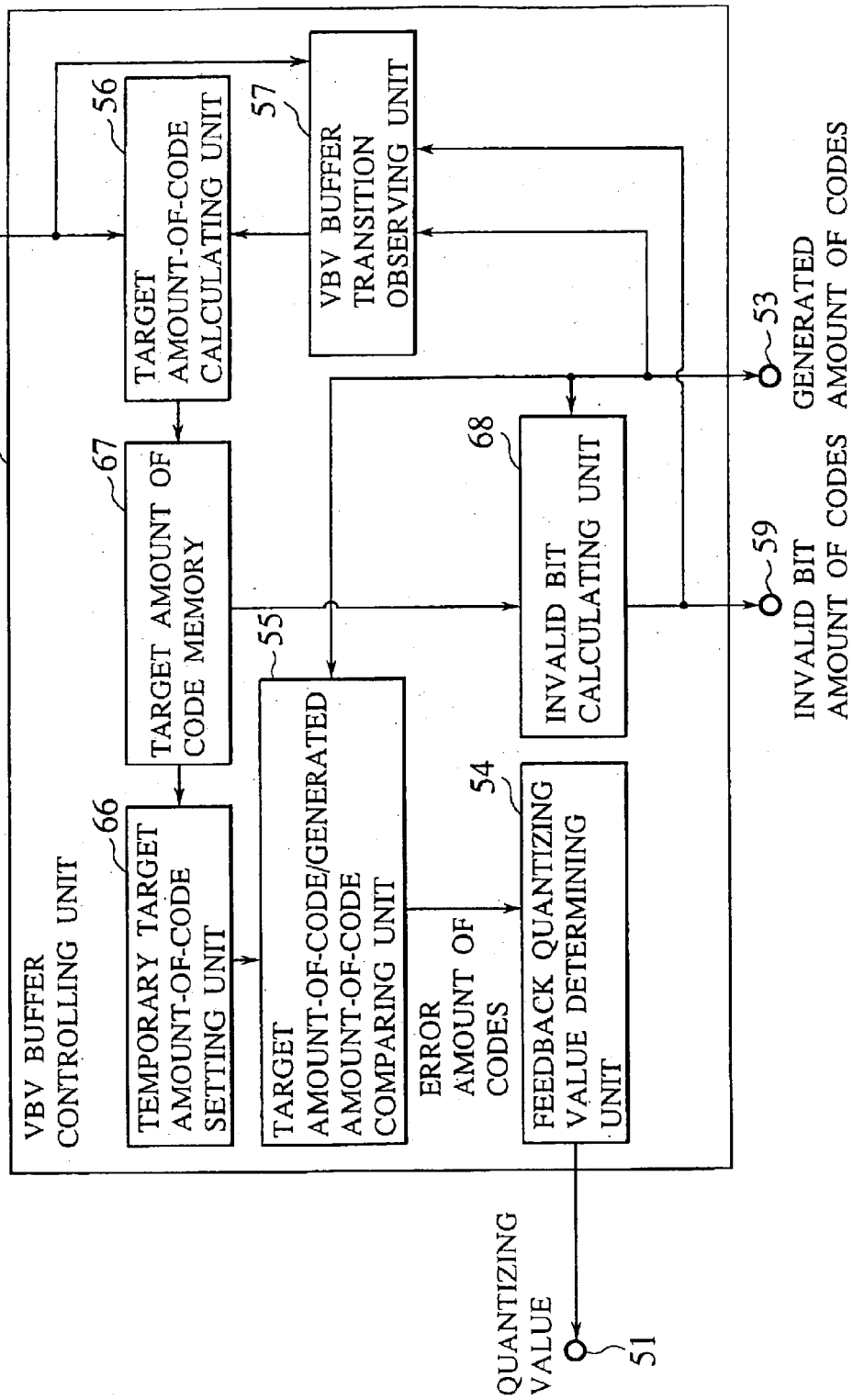
FIG. 17 is a view illustrating a schematic construction of a VBV buffer controlling unit of the audio/video encoding apparatus according to the seventh embodiment of the present invention.

In the VBV buffer control unit 41 illustrated in FIG. 17, the generated amount of codes message that has been supplied from the buffer memory 6 via the terminal 53 is sent to the target amount-of-code/generated amount-of-code comparing unit 55 and also to the invalid bit calculating unit 68.

The target amount-of-code calculating unit 56 operates in the same way as was stated previously, and, according to the encoding rate message, this unit 56 determines the target amount of codes with regard to each picture. Also, in this seventh embodiment as well, the timings with which the amounts of occupation of the VBV buffer are made to converge into the above-described VBV values 1 to E by the VBV buffer transition observing unit 57 are, respectively, the points in time when encoding is performed of the first reference picture image (I picture) that is a picture image to be independently encoded, the second reference picture image (the initial P picture), the third reference picture image (the next P picture), . . . , and the final picture image (the final B picture) of the video object unit. It is to be noted that, in the following explanation, each of the respective picture images, with regard to which these VBV buffer values are made to converge into the VBV values 1 to E, is hereinafter called "a point-of-convergence picture image".

The target amount-of-code memory 67 temporarily accumulates the target amount-of-code message that has been supplied from the target amount-of-code calculating unit 56, and thereafter reads it out and supplies it to the temporary target amount-of-code setting unit 66 and the invalid bit calculating unit 68.

The temporary target amount-of-code setting unit 66 sets as a temporary target amount of codes the value that is approximately 10% or so smaller than the value of the target amount of codes that has been supplied from the target amount-of-code memory 67.

Here, the target amounts of codes of the above-described respective point-of-convergence picture images are each set, in the temporary target amount-of-code setting unit 66, to be at a value that is approximately 10% or so smaller than the target amount of codes that has been calculated in the target amount-of-code calculating unit 56. This temporary target amount of codes is sent to the target amount-of-code/generated amount-of-code comparing unit 55.

Accordingly, in the case of this FIG. 17, the target amount-of-code/generated amount-of-code comparing unit 55 compares the generated amount of codes that has been supplied from the buffer memory 6 via the terminal 53 with the temporary target amount of codes that has been set by the temporary target amount-of-code setting unit 66. And, the comparing unit 55 thereby produces an error amount of codes that is the error or difference between the temporary target amount of codes and the generated amount of codes. This error amount-of-code message is sent to the feedback quantizing value-determining unit 54. The generated amount of codes is thereby so controlled as to coincide with the temporary target amount of codes.

On the other hand, the invalid bit calculating unit 68 adds, at the point in time when the encoding of the 1 picture has been finished, the generated amount of codes in macroblock units that has been input beforehand from the buffer memory 6. The calculating unit 68 thereby calculates the difference between a total generated amount of codes that regards the 1 picture and the target amount of codes that regards the 1 picture. Then, the unit 68 outputs the difference as an invalid bit amount-of-code message. This invalid bit amount-of-code message is sent to the invalid bit adding unit 22 of FIG. 16 via the terminal 59.

The-invalid bit-adding unit 22 of FIG. 16 adds to the encoded data from the VLC unit 5 the invalid bits that correspond to the invalid bit amount-of-code message and that are supplied from the amount-of-code controlling unit 21. As a result of this, the data that is output from the invalid bit adding unit 22 becomes the one which has been so accurately controlled as to conform to the target amount of codes. And this encoded data is sent to the buffer memory 6.

Also, the invalid bit amount-of-code message from the invalid bit calculating unit 68 is also transmitted to the VBV buffer transition-observing unit 57. The VBV buffer transition-observing unit 57 also counts the value of this invalid bit amount-of-code message as the amount of codes that regards the above-described point-of-convergence picture image.

Additionally, with only the point-of-convergence picture image, it is also thought that a case where its corresponding VBV buffer values becomes unable to converge into their relevant values occurs. Namely, there is the possibility that a large amount of codes will have inconveniently been generated in correspondence with the picture that precedes the point-of-convergence picture image. Accordingly, in this embodiment, even when it is wanted to allot a large amount of codes with respect to a picture image, it is preferable to distribute the amount of codes with respect to this picture image so that this amount of codes may be in conformity with the following formula (44).

(Number of picture images from Point-of-convergence picture image (n) to Point-of-convergence picture image (n+1))×(Video Rate/29.97)−(VBV value (n)−VBV value (n−1))  (44)

According to the audio/video encoding apparatus of this seventh embodiment, the same effects as those attainable with the audio/video encoding apparatus of the sixth embodiment are not only obtained but, since the amount of codes can be controlled very accurately without having even one byte of error contained therein, it is possible to lessen the possibility very much that the contents of the navigation data and the actual amount of encoded data will become inconsistent with each other.

It should be understood that many modifications and adaptations of the invention will become apparent to those skilled in the art and it is intended to encompass such obvious modifications and changes in the scope of the claims appended hereto.

What is claimed is:

1. A data coding method wherein input data in prescribed data units is classified into a picture type whose data items are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding method comprising the steps of:

determining an encoding rate;

determining a target amount of codes for each picture type that corresponds to the encoding rate;

encoding the input data for each picture type so that the coded data may be in conformity with the target amount of codes;

determining, on the basis of the encoding rate and the target amount of codes, addresses of a reference unit for making a search and a prescribed number of units that are reproduced within at least N (N is a positive integer that is less than 16) frames before and after the reference unit and an ending address at which there is ended at least data of the picture type having its data items independently encoded, of the data within the unit;

constructing as the unit the coded data that has been obtained by being encoded so that the coded data may be in conformity with the target amount of codes; and depicting at a foremost position of the unit the addresses of the unit and the ending address at which data of the picture type having its data items independently encoded is ended.

2. A data coding method according to claim 1, wherein when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

3. A data coding method according to claim 1, wherein determination is made of a total amount of codes of the unit as a whole from the target amount of codes for each picture type.

4. A data coding method according to claim 1, wherein ending addresses at which there are ended data of a first reference I-picture, data of a second reference P-picture, and data of a third reference P-picture, of the data within the unit are determined.

5. A data coding method wherein input data in prescribed data units is classified into a picture type whose data items are independently encoded and a picture type whose data items are encoded by being mutually related between each two thereof and the data items are encoded according to their respective picture type, whereby the thus-encoded data items are made up into a row of packs that is to be reproduced within a prescribed period of time and are stored into a unit, the data coding method comprising the steps of:

determining an encoding rate;

determining a fixed target amount of codes for each unit on the basis of the encoding rate;

encoding the input data so that the coded data may be in conformity with the fixed target amount of codes for each unit;

storing the encoded data temporarily;

determining, on the basis of the encoding rate and the fixed target amount of codes, addresses of a reference unit for making a search and a prescribed number of units that are reproduced within at least N (N is a positive integer that is less than 16) frames before and after the reference unit;

determining, on the basis of the temporarily stored and encoded data, an ending address at which there is ended at least data of the picture type having its data items independently encoded, of the data within the unit and an ending address of prescribed reference data that is uniquely discriminated from a foremost position of the unit;

constructing as the unit the coded data that has been obtained by being encoded so that the coded data may be in conformity with the target amount of codes; and depicting at a foremost position of the unit the addresses of the unit and the ending address at which data of the picture type having its data items independently encoded is ended.

6. A data coding method according to claim 5, wherein when the input data is encoded so that the coded data may be in conformity with the target amount of codes, the encoding of the input data is performed in a temporary amount of codes that has been prepared by setting the amount of codes to be at a value smaller by a prescribed amount of codes than the target amount of codes, and the difference between an amount of codes generated by the encoding performed into the temporary target amount of codes and the target amount of codes is adjusted using invalid bits, thereby encoding the input data so that the coded data may be in conformity with the target amount of codes.

7. A data coding method according to claim 5, wherein ending addresses at which there are ended data of a first reference I-picture, data of a second reference P-picture, and data of a third reference P-picture, of the data within the unit are determined.

8. A data coding method wherein input data in units of prescribed data is encoded, comprising the steps of:

determining an encoding rate;

determining a target amount of codes in units of the prescribed data in correspondence with the encoding rate;

determining transition in the amount of occupation of a virtual buffer that corresponds to a decoding buffer that is used when decoding is performed;

encoding prescribed reference data of the input data so that the coded data may be in conformity with the target amount of codes that has been corrected according to a prescribed value into which the amount of occupation of the virtual buffer, prevailing at the point in time when encoding is performed, is made to converge;

storing into within the unit the data that has been encoded as a row of packs that is to be reproduced within a prescribed period of time;

determining, on the basis of the encoding rate, addresses of a reference unit for making a search and a prescribed number of units that are reproduced within at least N (N is a positive integer that is less than 16) frames before and after the reference unit and an ending address at which the prescribed reference data within the unit is ended; and depicting the address of the unit and the ending address at which the prescribed reference data within the unit is ended at a foremost position of the unit.

9. A data coding method according to claim 8, wherein, when encoding the prescribed reference data within the unit so that the coded data may be in conformity with the target amount of codes, the prescribed reference data is encoded so as for the coded data to conform to a temporary target amount of codes that has been set to be lower by a prescribed amount than the target amount of codes that has been corrected according to the prescribed value into which the amount of occupation of the virtual buffer is made to converge; and, by the use of invalid bits, adjustment is performed of the difference between the generated amount of codes, that has been generated by encoding performed in conformity with the temporary target amount of codes, and the target amount of codes that has been thus corrected, whereby the prescribed reference data is encoded so that the coded data may be in conformity with the target amount of codes.

* * * * *